United States Patent
Fang et al.

(10) Patent No.: US 11,237,664 B2
(45) Date of Patent: Feb. 1, 2022

(54) METHOD AND DEVICE FOR DRIVING TOUCH DISPLAY PANEL

(71) Applicants: Hefei BOE Optoelectronics Technology Co., Ltd., Anhui (CN); BOE Technology Group Co., Ltd., Beijing (CN)

(72) Inventors: Zhixiang Fang, Beijing (CN); Liangliang Zheng, Beijing (CN); Guanglei Yang, Beijing (CN); Peng Ding, Beijing (CN)

(73) Assignees: Hefei BOE Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/766,677

(22) PCT Filed: Nov. 8, 2019

(86) PCT No.: PCT/CN2019/116650
§ 371 (c)(1),
(2) Date: May 23, 2020

(87) PCT Pub. No.: WO2020/140606
PCT Pub. Date: Jul. 9, 2020

(65) Prior Publication Data
US 2021/0216162 A1    Jul. 15, 2021

(30) Foreign Application Priority Data
Jan. 2, 2019   (CN) .......................... 201910002911.0

(51) Int. Cl.
*G06F 3/041*   (2006.01)
*G09G 3/36*    (2006.01)
*G06F 3/147*   (2006.01)

(52) U.S. Cl.
CPC ......... *G06F 3/0416* (2013.01); *G09G 3/3607* (2013.01); *G09G 3/3614* (2013.01);
(Continued)

(58) Field of Classification Search
USPC ........................................ 345/174
See application file for complete search history.

(56) References Cited

U.S. PATENT DOCUMENTS

2008/0094342 A1* 4/2008 Kim ................. G09G 3/3611
                                                       345/99
2012/0299895 A1* 11/2012 Lin ................. G09G 3/3655
                                                       345/211
(Continued)

FOREIGN PATENT DOCUMENTS

CN       202837748 U       3/2013
CN       103366707 A      10/2013
(Continued)

OTHER PUBLICATIONS

Chinese Office Action dated Dec. 23, 2019 in related Chinese Application No. 201910002911.0.

*Primary Examiner* — Chineyere D Wills-Burns
(74) *Attorney, Agent, or Firm* — Arent Fox LLP; Michael Fainberg

(57) ABSTRACT

The present disclosure discloses a driving method and device of a touch display panel. The driving method includes: acquiring image data of an image to be displayed; judging whether the acquired image data is a reloaded picture with a default polarity mode; performing polarity adjustment on the image data when judging that the image data is a reloaded picture with a default polarity mode; and driving the touch display panel to display image according to the image data after polarity adjustment. Wherein the default polarity mode includes: the polarities of image data
(Continued)

corresponding to each two adjacent data lines are opposite, while the polarities of image data corresponding to the same data line are the same.

18 Claims, 11 Drawing Sheets

(52) U.S. Cl.
CPC ............... *G09G 2300/0439* (2013.01); *G09G 2310/027* (2013.01)

(56) References Cited

U.S. PATENT DOCUMENTS

| | | | |
|---|---|---|---|
| 2013/0088528 A1* | 4/2013 | Borgers | G09G 3/3648 345/690 |
| 2013/0169617 A1* | 7/2013 | Cheng | G09G 3/3614 345/212 |
| 2015/0022560 A1* | 1/2015 | Fu | G09G 3/3614 345/690 |
| 2017/0186389 A1* | 6/2017 | Hwang | G09G 3/2092 |
| 2017/0193934 A1* | 7/2017 | Liu | G02F 1/1368 |
| 2017/0213501 A1* | 7/2017 | Lim | G09G 3/2003 |
| 2019/0384437 A1* | 12/2019 | Kim | G06F 3/04162 |

FOREIGN PATENT DOCUMENTS

| | | |
|---|---|---|
| CN | 104238220 A | 12/2014 |
| CN | 105467704 A | 4/2016 |
| CN | 107507600 A | 12/2017 |
| CN | 107665692 A | 2/2018 |
| CN | 108198539 A | 6/2018 |
| CN | 109739461 A | 5/2019 |

\* cited by examiner

|       | $S_1$ | $S_2$ | $S_3$ | $S_4$ | $S_5$ | $S_6$ |
|-------|-------|-------|-------|-------|-------|-------|
| $G_1$ | +     | −     | +     | −     | +     | −     |
| $G_2$ | +     | −     | +     | −     | +     | −     |
| $G_3$ | +     | −     | +     | −     | +     | −     |
| $G_4$ | +     | −     | +     | −     | +     | −     |
| $G_5$ | +     | −     | +     | −     | +     | −     |
| $G_6$ | +     | −     | +     | −     | +     | −     |

Fig. 9A

|       | $S_1$ | $S_2$ | $S_3$ | $S_4$ | $S_5$ | $S_6$ |
|-------|-------|-------|-------|-------|-------|-------|
| $G_1$ | +     | +     | −     | −     | +     | +     |
| $G_2$ | +     | +     | −     | −     | +     | +     |
| $G_3$ | +     | +     | −     | −     | +     | +     |
| $G_4$ | +     | +     | −     | −     | +     | +     |
| $G_5$ | +     | +     | −     | −     | +     | +     |
| $G_6$ | +     | +     | −     | −     | +     | +     |

|     | $S_1$ | $S_2$ | $S_3$ | $S_4$ | $S_5$ | $S_6$ |
|-----|-------|-------|-------|-------|-------|-------|
| $G_1$ | + | − | + | − | + | − |
| $G_2$ | + | − | + | − | + | − |
| $G_3$ | + | − | + | − | + | − |
| $G_4$ | + | − | + | − | + | − |
| $G_5$ | + | − | + | − | + | − |
| $G_6$ | + | − | + | − | + | − |

Q6 (column $S_1$), Q5 (column $S_4$)

Fig. 14A

|     | $S_1$ | $S_2$ | $S_3$ | $S_4$ | $S_5$ | $S_6$ |
|-----|-------|-------|-------|-------|-------|-------|
| $G_1$ | + | − | + | + | + | − |
| $G_2$ | + | − | + | + | + | − |
| $G_3$ | + | − | + | + | + | − |
| $G_4$ | + | − | + | + | + | − |
| $G_5$ | + | − | + | + | + | − |
| $G_6$ | + | − | + | + | + | − |

Q4 (column $S_1$), Q3 (column $S_4$)

Fig. 14B

METHOD AND DEVICE FOR DRIVING TOUCH DISPLAY PANEL

The present application is a National Stage of International Application No. PCT/CN2019/116650, filed Nov. 8, 2019, which claims the priority to Chinese Patent Application No. 201910002911.0, filed with the Chinese Patent Office on Jan. 2, 2019 and entitled "Method for Driving Touch Display Panel and Readable Storage Medium", which is hereby incorporated by reference in its entirety.

FIELD

The present disclosure relates to the field of display technology, in particular to a method and device for driving a touch display panel.

BACKGROUND

In a touch and display driver integration (TDDI for short) technology, a touch chip and a display chip are integrated into a single chip, such that a display screen has thinner appearance and lower cost. Generally, the TDDI display screen is usually provided with multiple touch electrodes, and the touch electrodes and data lines are generally arranged at different film layers. The TDDI display screen can adopt a driving manner of column inversion, and polarities of data signals exerted by two adjacent data lines are opposite, so as to drive liquid crystal flip to realize image display. However, when a reloaded picture is displayed, since the gray scale span of adjacent color blocks in the reloaded picture is large, the coupling degrees of the touch electrodes coupled by data lines are different in different regions, part of the regions can recover rapidly, while part of the regions recover slowly, thereby leading to generation of horizontal stripes due to uneven recovery of coupling when the reloaded picture is displayed, and influencing the display effect.

SUMMARY

A method for driving a touch display panel provided in embodiments of the present disclosure includes: acquiring image data of an image to be displayed; judging whether the acquired image data is a reloaded picture with a default polarity mode, wherein the default polarity mode includes: the polarities of image data corresponding to each two adjacent data lines are opposite, while the polarities of image data corresponding to the same data line are the same; performing polarity adjustment on the image data when judging that the image data is a reloaded picture with the default polarity mode; and driving the touch display panel to display image according to the image data after polarity adjustment.

Optionally, in the embodiment of the present disclosure, the step of judging whether the acquired image data is a reloaded picture with a default polarity mode includes: determining the number of the first data lines and the number of the second data lines loading the image data according to the acquired image data, where the first data lines are data lines with the voltage increase amplitude, from the image data loaded at a first moment to the image data loaded at a second moment, being greater than or equal to a threshold value; the second data lines are data lines with the voltage reduction amplitude, from the image data loaded at the first moment to the image data loaded at the second moment, being greater than or equal to the threshold value; the first moment is a moment at which the $n^{th}$ gate line loads a gate opening signal, the second moment is a moment at which the $(n+1)^{th}$ gate line loads a gate opening signal, and n is an integer greater than or equal to 1; the threshold value is a voltage difference between a first image data and a second image data which have the same polarity, and the gray scales corresponding to the first image data differ from the gray scales corresponding to the second image data by at least 2 gray scales; and when the ratio of the number of the first data line to the number of the second data line is smaller than or equal to 1/2, or when the ratio of the number of the first data lines to the number of the second data lines is greater than 2, determining the image data to be the reloaded picture with the default polarity mode, otherwise determining the image data not to be the reloaded picture with the default polarity mode.

Optionally, in the embodiment of the present disclosure, the reloaded picture includes: one or a combination of a checkerboard picture or a striped picture.

Optionally, in the embodiment of the present disclosure, the reloaded picture includes: a checkerboard picture; and the step of judging whether the acquired image data is the checkerboard picture with a default polarity mode includes: determining the arrangement mode of first image blocks and second image blocks formed by loading the image data according to the acquired image data; where the first image block includes at least one sub-pixel; the second image block includes at least one sub-pixel; the number of the sub-pixels contained in the first image block is the same as the number of the sub-pixels contained in the second image block; and the gray scales corresponding to the first image block differ from the gray scales corresponding to the second image block at least by 2 gray scales; and when the first image blocks and the second image blocks are all arranged alternately along the direction of rows and columns, and the polarities of the image data corresponding to each two adjacent data lines are opposite, determining the image data to be the checkerboard picture with a default polarity mode, otherwise determining the image data not to be the checkerboard picture with a default polarity mode.

Optionally, in the embodiment of the present disclosure, a row of sub-pixels of the touch display panel are correspondingly electrically connected with the same gate line; the first image block includes: 2k+1 columns of sub-pixels arranged in a row direction; the second image block includes: 2k+1 columns of sub-pixels arranged in the row direction; and k is a positive integer; the data lines in the touch display panel are divided into multiple data line groups, wherein each data line group includes a data lines, and a is a multiple of 2; the performing polarity adjustment on the image data includes: when determining that the image data is the checkerboard picture with a default polarity mode, adjusting the polarities of the image data loaded by the same data line group to be the same, and adjusting the polarities of the image data loaded by two adjacent data line groups to be opposite.

Optionally, in the embodiment of the present disclosure, the number of the sub-pixels in the first image block is one; or, the number of the sub-pixels in the first image block is two, and the sub-pixels in the first image block and the sub-pixels in the second image block are arranged along an extension direction of the data lines.

Optionally, in the embodiment of the present disclosure, a row of sub-pixels of the touch display panel are correspondingly connected with two gate lines adjacent to the row of sub-pixels; the first image block includes: 2y columns of sub-pixels arranged in a row direction, and the second image block includes: 2y columns of sub-pixels arranged in the row direction; and y is a positive integer; the data lines in the touch display panel are divided into multiple data line groups, where each data line group includes b data lines, and b is a multiple of 2; the performing polarity adjustment on the image data includes: when determining that the image data is the checkerboard picture with a default polarity mode, adjusting the polarities of the image data loaded by the same data line group to be the same, and adjusting the polarities of the image data loaded by two adjacent data line groups to be opposite.

Optionally, in the embodiment of the present disclosure, the number of the sub-pixels in the first image block is two, and the sub-pixels in the first image block and the sub-pixels in the second image block are arranged along an extension direction of the gate lines.

Optionally, in the embodiment of the present disclosure, the touch display panel includes the first sub-pixel column to the $Q^{th}$ sub-pixel column arranged along an extension direction of the gate lines; and Q is a positive even number; two adjacent columns from the first sub-pixel column to the $Q^{th}$ sub-pixel column are divided into a second sub-pixel column group, and each second sub-pixel column group include the first image blocks and the second image blocks which are arranged alternately along a column direction; or, two adjacent columns from the second sub-pixel column to the (Q−1)th sub-pixel column are divided into a first sub-pixel column group, and each first sub-pixel column group includes the first image blocks and the second image blocks which are arranged alternately along a column direction; and the first sub-pixel column and the Qth sub-pixel column respectively include the first sub-pixels and the second sub-pixels which are arranged alternately; where the gray scales corresponding to the first sub-pixel are roughly the same as the gray scales corresponding to the first image block, the gray scales corresponding to the second sub-pixel are roughly the same as the gray scales corresponding to the second image block, and the first sub-pixels and the second image blocks are adjacent in the row direction, and the second sub-pixels and the first image blocks are adjacent in the row direction.

Optionally, in the embodiment of the present disclosure, the reloaded picture includes: a striped picture; and the step of judging whether the acquired image data is the striped picture with a default polarity mode includes: determining the arrangement mode of third image blocks and fourth image blocks formed by loading the image data according to the acquired image data; where the third image block includes at least two sub-pixels and the fourth image block includes at least two sub-pixels, and the gray scales corresponding to the third image block differ from the gray scales corresponding to the fourth image block at least by 2 gray scales; when the third image blocks are arranged into multiple columns along a row direction, the fourth image blocks are arranged into multiple columns along the row direction, the third image blocks and the fourth image blocks are arranged alternately along the row direction, and the polarities of the image data corresponding to two adjacent data lines are opposite, determining the image data to be the striped picture with a default polarity mode, otherwise, determining the image data not to be the striped picture with a default polarity mode.

Optionally, in the embodiment of the present disclosure, a row of sub-pixels of the touch display panel are correspondingly connected with two gate lines adjacent to the row of sub-pixels; the third image block includes 2m columns of sub-pixels arranged in a row direction, the fourth image block includes 2m columns of sub-pixels arranged in a row direction, and m is an odd number; the data lines in the touch display panel are divided into multiple data line groups, wherein each data line group includes c data lines, and c is a multiple of 2; the step of polarity adjustment on the image data includes: when determining that the image data is the striped picture with a default polarity mode, adjusting the polarities of the image data loaded by the same data line group to be the same, and adjusting the polarities of the image data loaded by two adjacent data line groups to be opposite.

Optionally, in the embodiment of the present disclosure, the touch display panel includes the first sub-pixel column to the $P^{th}$ sub-pixel column which are arranged along an extension direction of the gate lines; and P is a positive even number; the second sub-pixel column to the $(P-1)^{th}$ sub-pixel column include the arranged third image blocks and fourth image blocks, the gray scales corresponding to the sub-pixels in the first sub-pixel column are the same, and the gray scales corresponding to the sub-pixels in the $P^{th}$ sub-pixel column are the same, wherein the third image block includes two adjacent columns of sub-pixels arranged in the row direction, the fourth image block includes two adjacent columns of sub-pixels arranged in the row direction, the gray scale corresponding to the first sub-pixel column is different from the gray scale corresponding to the second sub-pixel column, and the gray scale corresponding to the $P^{th}$ sub-pixel column is different from the gray scale corresponding to the $(P-1)^{th}$ sub-pixel column.

Optionally, in the embodiment of the present disclosure, the gray scales corresponding to the sub-pixels in the first sub-pixel column, the $P^{th}$ sub-pixel column and the third image block are roughly the same.

Optionally, in the embodiment of the present disclosure, the reloaded picture includes: a mixed picture containing a checkerboard picture and a striped picture; and the performing polarity adjustment on the image data includes: when determining the image data to be the mixed picture with a default polarity mode, adjusting the number of the first data lines to be roughly the same as the number of the second data lines.

The embodiment of the present disclosure further provides a driving device of a touch display panel, including: an acquisition circuit, configured to acquire image data of an image to be displayed; a judgment circuit, configured to judge whether the acquired image data is a reloaded picture with a default polarity mode, wherein the default polarity mode includes: the polarities of image data corresponding to each two adjacent data lines are opposite, while the polarities of image data corresponding to the same data line are the same; an adjustment circuit, configured to perform polarity adjustment on the image data when the image data is judged to be a reloaded picture with the default polarity mode; and a display driving circuit, configured to drive the touch display panel to display image according to the image data after polarity adjustment.

The embodiment of the present disclosure further provides a display device, including: a touch display panel and the above driving device.

The embodiment of the present disclosure further provides a readable non-temporary storage medium, where the readable non-temporary storage medium stores executable instructions of a touch display panel, and the executable instructions of the touch display panel are configured to enable the touch display panel to perform the steps of the method for driving a touch display panel.

The embodiment of the present disclosure further provides a computer device, including a memory, a processor, and computer programs stored on the memory and capable of running on the processor, wherein the processor realizes the steps of the method for driving a touch display panel when executing the computer programs.

BRIEF DESCRIPTION OF THE DRAWINGS

In order to more clearly illustrate technical solutions in embodiments of the present disclosure, a brief introduction will be given below on accompanying drawings which need to be used in the description of the embodiments of the present disclosure. Apparently, the accompanying drawings described below are merely some embodiments of the present disclosure. Those skilled in the art can obtain other accompanying drawings according to these drawings without any creative effort.

FIG. 8A is a first schematic diagram of a reloaded picture satisfying a first rule provided in an embodiment of the present disclosure.

FIG. 8B is a schematic diagram of a reloaded picture after FIG. 8A is subjected to polarity adjustment.

FIG. 9A is a second schematic diagram of a reloaded picture satisfying a first rule provided in an embodiment of the present disclosure.

FIG. 9B is a schematic diagram of a reloaded picture after FIG. 9A is subjected to polarity adjustment.

FIG. 10A is a third schematic diagram of a reloaded picture satisfying a first rule provided in an embodiment of the present disclosure.

FIG. 10B is a schematic diagram of a reloaded picture after FIG. 10A is subjected to polarity adjustment.

FIG. 11A is a fourth schematic diagram of a reloaded picture satisfying a first rule provided in an embodiment of the present disclosure.

FIG. 11B is a schematic diagram of a reloaded picture after FIG. 11A is subjected to polarity adjustment.

FIG. 12A is a schematic diagram of a reloaded picture satisfying a second rule provided in an embodiment of the present disclosure.

FIG. 12B is a schematic diagram of a reloaded picture after FIG. 12A is subjected to polarity adjustment.

FIG. 13A is subjected to polarity adjustment.

FIG. 14A is a second schematic diagram of a reloaded picture satisfying a third rule provided in an embodiment of the present disclosure.

FIG. 14B is a schematic diagram of a reloaded picture after FIG. 14A is subjected to polarity adjustment.

DETAILED DESCRIPTION OF THE EMBODIMENTS

In order to make the objectives, technical solutions, and advantages of the present disclosure clearer, the present disclosure will be described in detail below in combination with accompanying drawings. Apparently, the described embodiments are only a part but not all of the embodiments of the present disclosure. Based upon the embodiments of the present disclosure, all of the other embodiments obtained by those skilled in the art without any creative effort shall all fall within the protection scope of the present disclosure.

A brief introduction will be given below on the method for driving the touch display panel and the readable non-temporary storage medium provided in specific embodiments of the present disclosure in combination with accompanying drawings.

Figure 1:
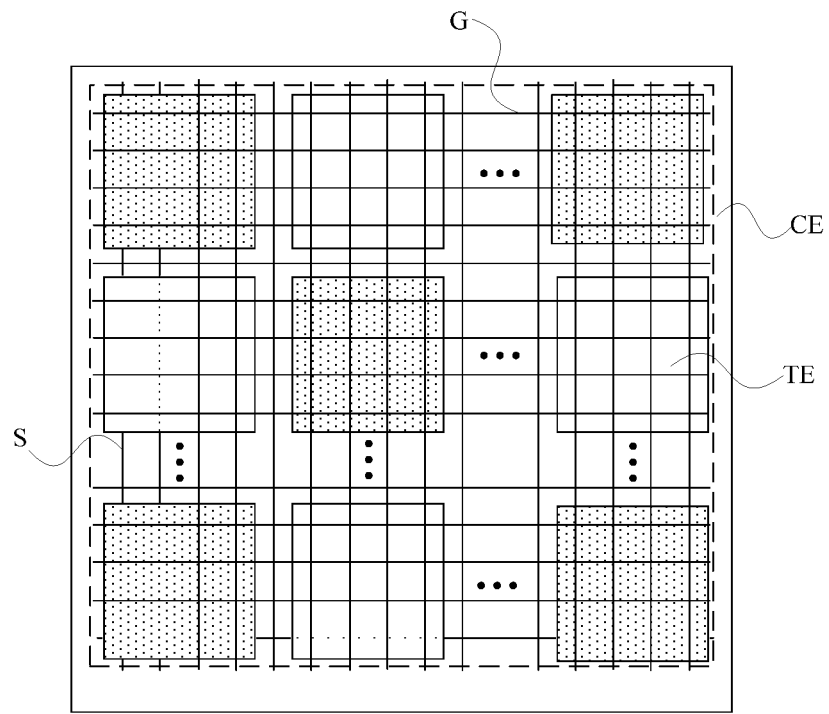
FIG. 1 is a structural schematic diagram of a top view of a touch display panel provided in an embodiment of the present disclosure.
Figure 2:
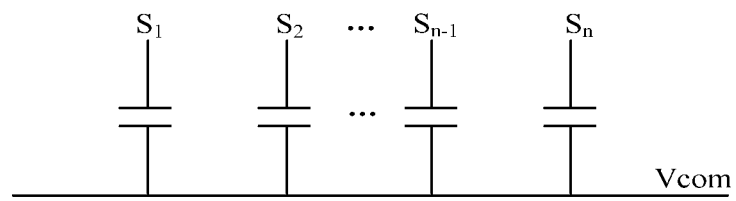
FIG. 2 is a first schematic diagram of a coupling principle provided in an embodiment of the present disclosure.

As shown in FIG. 1, in general, a liquid crystal display panel usually includes a sub-pixel electrode and a common electrode CE configured to control the flip of liquid crystals. The common electrode CE is segmented into multiple electrode blocks, and these electrode blocks can be reused as touch electrode TEs. When the liquid crystal display panel performs image display, a driving mode in which a gate line G scans line by line and a data line S loads data signals to the sub-pixel unit is generally adopted for image display. The data line and the touch electrode are generally arranged in different film layers, and an insulating film layer exists between two film layers to isolate the two film layers, such that a parasitic capacitor is formed between the data lines ($S_1$-$S_n$) and the touch electrode (the electrode Vcom of the common electrode), as shown in FIG. 2.

Figure 3:
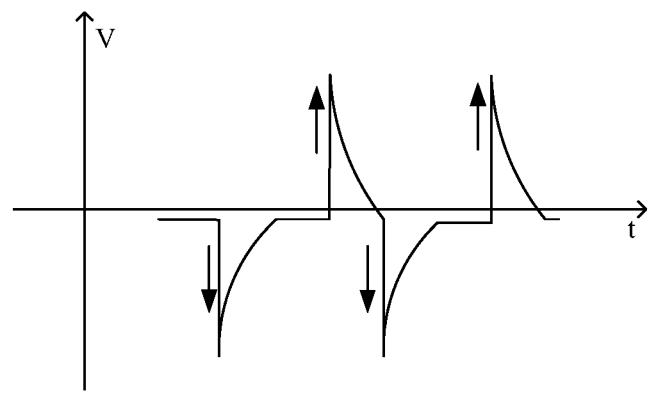
FIG. 3 is a second schematic diagram of a coupling principle provided in an embodiment of the present disclosure.

In general, the liquid crystal display panel can adopt a driving manner of column inversion for image display, that is, polarities of the data signals loaded by two adjacent data lines are opposite. In an actual application, each time the gate lines (G1-G4) load gate opening signals, the data lines load data signals. As shown in FIG. 3, when the data lines load data signals each time, the touch electrode will be subjected to a coupling effect of data lines in a direction deviating from a direction (an up arrow or a down arrow in FIG. 3) of a reference potential, and the coupling degrees of the touch electrode coupled by data lines are different in different regions of the touch electrode. Then when data signals with greater changes are loaded to data lines repeatedly to form a reloaded picture, if the potential of the touch electrode is always pulled towards the same direction due to the coupling effect of the data lines and cannot be effectively recovered to its reference potential, then horizontal stripes will be generated, to thereby influence the display effect.

Figure 4:
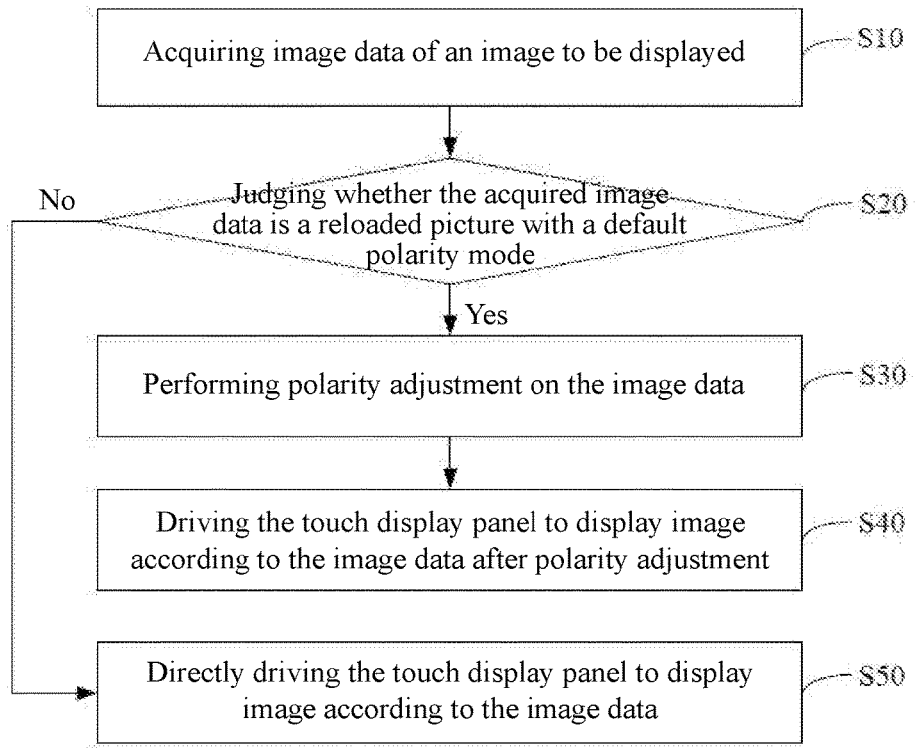
FIG. 4 is a first flow chart of a method for driving a touch display panel provided in an embodiment of the present disclosure.

In view of this, the embodiments of the present disclosure provide a method for driving a touch display panel, as shown in FIG. 4, the method includes the following steps.

S10, acquiring image data of an image to be displayed.

S20, judging whether the acquired image data is a reloaded picture with a default polarity mode, where the default polarity mode includes: the polarities of image data corresponding to each two adjacent data lines are opposite, and the polarities of image data corresponding to the same data line are the same; performing steps S30-S40 when judging that the image data is a reloaded picture with a default polarity mode, and performing step S50 when judging that the image data is not a reloaded picture with a default polarity mode.

S30, performing polarity adjustment on the image data.

S40, driving the touch display panel to display image according to the image data after polarity adjustment.

S50, directly driving the touch display panel to display image according to the image data.

Under normal conditions, the default polarity mode includes: the polarities of image data corresponding to each two adjacent data lines are opposite, and the polarities of image data corresponding to the same data line are the same, this can mean that a reloaded picture is displayed by adopting a driving manner of column inversion, after image data is loaded, horizontal stripes are usually generated in the displayed image picture, thereby seriously influencing the display effect.

In the above driving method provided in the embodiments of the present disclosure, the image data of the displayed image is firstly acquired before image display, when the image data is the image data of a reloaded picture with a default polarity mode, the image data of the reloaded picture is subjected to polarity adjustment, such that the image displayed by the adjusted image data is unchanged, and meanwhile, the potential of the touch electrode is prevented from being pulled towards the same direction and deviating from its reference voltage. In this way, when the image data after polarity adjustment is loaded, horizontal stripes can be avoided on the displayed image, thereby optimizing display effect.

Moreover, in the driving method provided in the embodiments of the present disclosure, only the polarity of the image data is adjusted, and image display of the liquid crystal display panel will not be influenced, therefore, the displayed image can be the same as the image before adjustment, but the image data after adjustment will not lead to generation of displayed horizontal stripes, thereby further optimizing the display effect.

Figure 5:
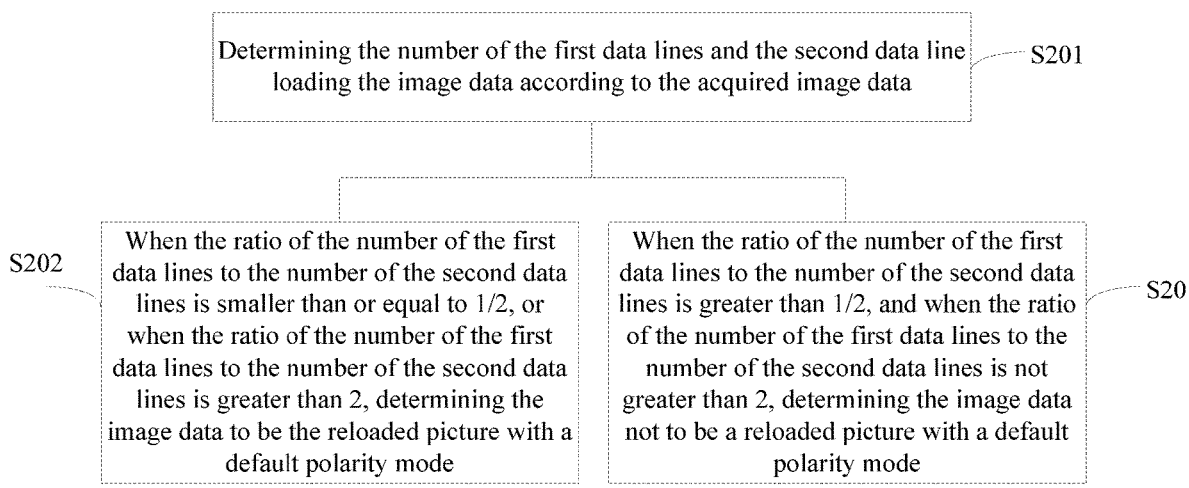
FIG. 5 is a second flow chart of a method for driving a touch display panel provided in an embodiment of the present disclosure.

Optionally, during specific implementation, in the embodiments of the present disclosure, as shown in FIG. 5, in the above step S20, the step of judging whether the acquired image data is a reloaded picture with a default polarity mode includes the following steps.

S201, determining the number of first data lines and the number of second data lines loading the image data according to the acquired image data, where the first data lines are data lines with a voltage increase amplitude, from the image data loaded at a first moment to the image data loaded at a second moment, being greater than or equal to a threshold value; the second data lines are data lines with a voltage reduction amplitude, from the image data loaded at the first moment to the image data loaded at the second moment, being greater than or equal to the threshold value; the first moment is a moment at which an nth gate line loads a gate opening signal, the second moment is a moment at which an (n+1)th gate line loads the gate opening signal, and n is an integer greater than or equal to 1; the threshold value is a voltage difference between a first image data and a second image data which have the same polarity, and the gray scales corresponding to the first image data differ from the gray scales corresponding to the second image data by at least 2 gray scales.

S202, when the ratio of the number of the first data lines to the number of the second data lines is smaller than or equal to 1/2, or when the ratio of the number of the first data lines to the number of the second data lines is greater than 2, determining the image data to be the reloaded picture with the default polarity mode, otherwise determining the image data not to be the reloaded picture with the default polarity mode.

That is, S203, when the ratio of the number of the first data line to the number of the second data line is greater than 1/2, and when the ratio of the number of the first data line to the number of the second data line is not greater than 2, determining the image data not to be the reloaded picture with the default polarity mode.

Optionally, during specific implementation, in the embodiments of the present disclosure, when the ratio of the number of the first data lines to the number of the second data lines is less than or equal to 1/2, the image data is determined to be a reloaded picture with a default polarity mode, then polarity adjustment can be performed on the image data.

It should be noted that, the greater the ratio of the number of the first data lines to the number of the second data lines is, the more serious the technical problem is, in this way, a bright line penetrates through the whole screen of the touch display panel. If the ratio of the number of the first data lines to the number of the second data lines is small and pulling up or pulling down is relatively concentrated, then a relatively short bright line will be caused. Optionally, during specific implementation, in the embodiments of the present disclosure, when the ratio of the number of the first data lines to the number of the second data lines is greater than 2, the image data is determined to be a reloaded picture with a default polarity mode, then polarity adjustment can be performed on the image data.

During practical applications, the first data lines and the second data lines in the whole image can be determined, then the number of the first data lines and the second data lines can be counted, when the number of the first data lines is greater than 2 times the number of the second data lines, or when the number of the second data lines is greater than 2 times the number of the first data lines, the image data is determined to be a reloaded picture with a default polarity mode, then horizontal stripes are easily caused. Polarity adjustment needs to be performed on such image data, such that the number of the adjusted first data lines is the same as the number of the adjusted second data lines, then the coupling directions of the touch electrode coupled by each data line when the image data is loaded can be offset, and the potential of the touch electrode is maintained at a reference potential, thereby avoiding the generation of horizontal stripes.

During practical applications, when a reloaded picture such as a checkerboard picture or a striped picture is displayed, the above horizontal stripes are easily generated, therefore, before delivery of a touch display panel, such a reloaded picture is often used to detect the display panel. In the embodiments of the present disclosure, the adoption of a driving manner of column inversion to display the checkerboard picture or the striped picture can be used as a prior decision criterion, to detect the acquired image data. When the above criterion is satisfied, it indicates that horizontal stripes are easily generated when the acquired image data is loaded to display the image picture, and the display effect is influenced. At this time, the polarity of the image data needs to be adjusted, to avoid generation of horizontal stripes during display. However, besides the above checkerboard picture and striped picture, multiple other reloaded pictures will also lead to the display of horizontal stripes, for example, mixed pictures composed of a checkerboard picture and a striped picture, therefore, when the acquired image data is an image data of a mixed picture composed of a checkerboard picture and a striped picture, the polarity of the image data also needs to be adjusted, to avoid the display of horizontal stripes. During specific implementation, the reloaded picture can include: one or a combination of the checkerboard picture and the striped picture.

Moreover, in the embodiments of the present disclosure, only the polarity of the image data is adjusted, and image display of the liquid crystal display panel will not be influenced, therefore, the displayed image can be the same as the image before adjustment, but the image data after adjustment will not lead to generation of displayed horizontal stripes, thereby further optimizing the display effect.

Figure 6:
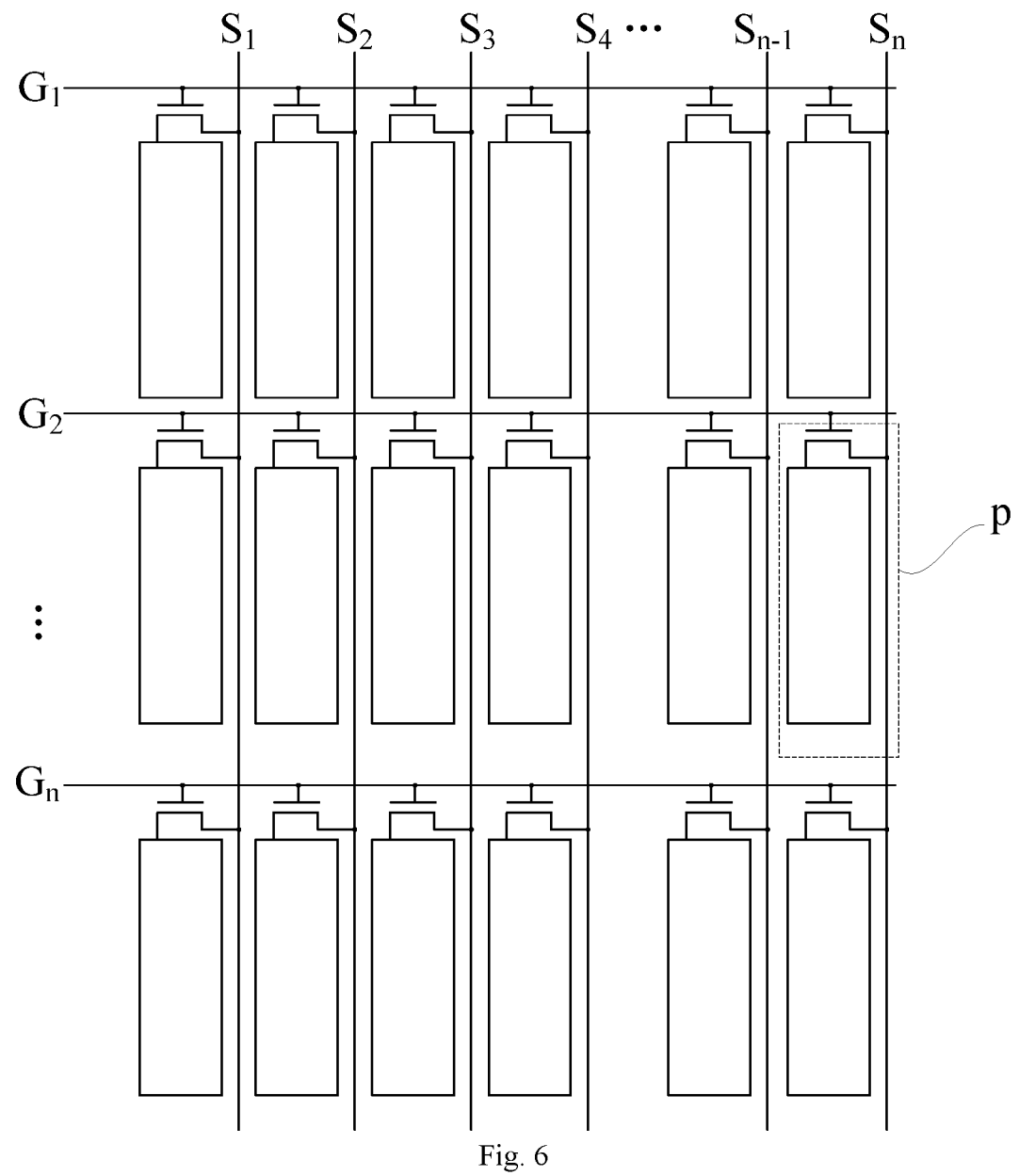
FIG. 6 is a structural schematic diagram of a touch display panel with a single gate line provided in an embodiment of the present disclosure.
Figure 7:
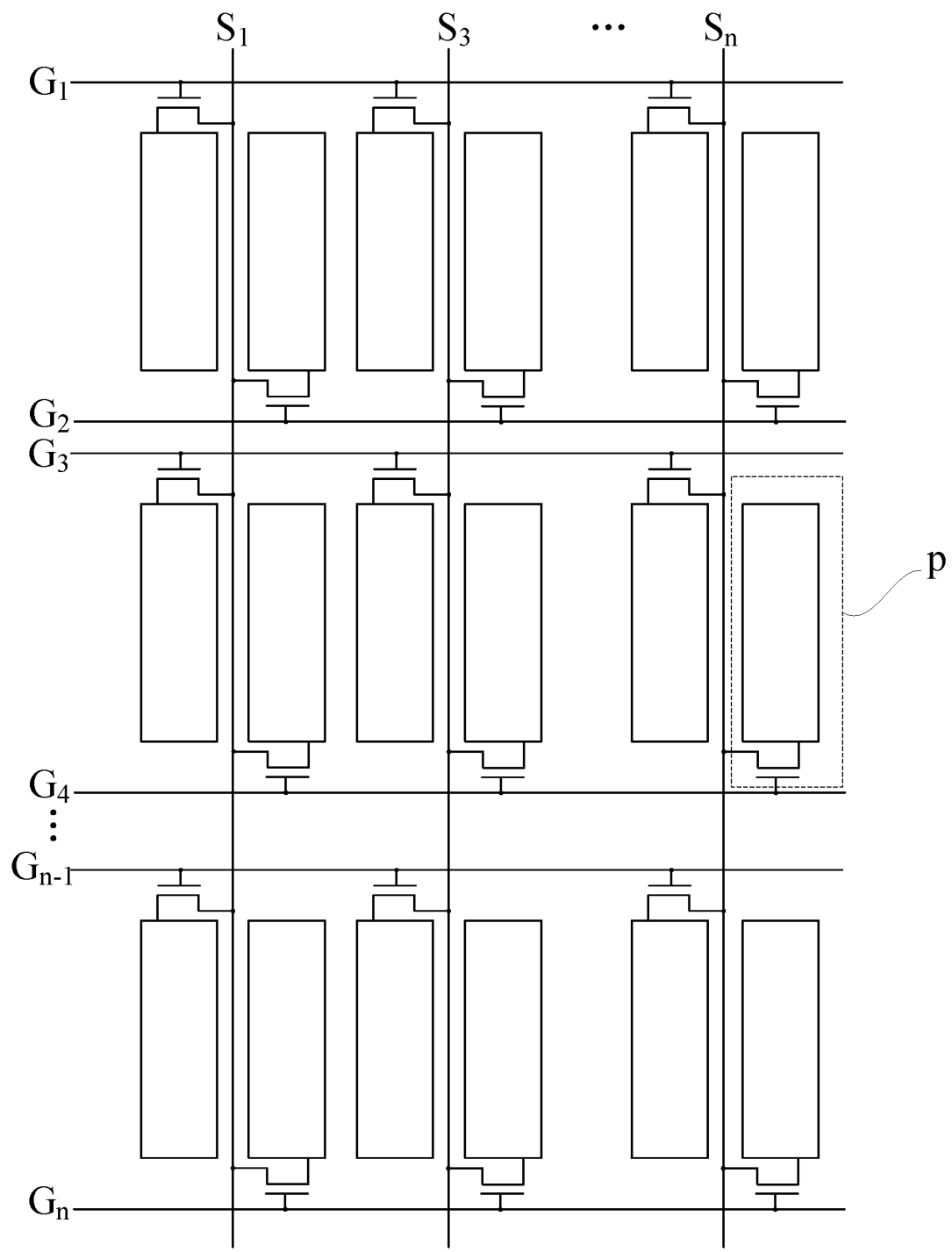
FIG. 7 is a structural schematic diagram of a touch display panel with double gate lines provided in an embodiment of the present disclosure.

During specific implementation, as shown in FIG. 6 and FIG. 7, the touch display panel may include: multiple gate lines, multiple data lines and multiple sub-pixels p. Each sub-pixel p may include: a thin film transistor and a sub-pixel electrode; a gate of the thin film transistor is electrically connected with the gate line, a source of the thin film transistor is electrically connected with the data line, and a drain of the thin film transistor is electrically connected with the sub-pixel electrode.

During practical applications, when a gate line loads gate opening signals, the thin film transistor is conducted, such that the data signals of data lines are transmitted to sub-pixel electrodes, to charge the sub-pixels p, and further drive the sub-pixels to display with different brightness.

During specific implementation, in a touch display panel with a single gate line structure, as shown in FIG. 6, the number of gate lines is the same as the number of the rows of sub-pixels, and the number of data lines is the same as the number of columns of sub-pixels. Exemplarily, as shown in FIG. 6, a row of sub-pixels p are correspondingly electrically connected with a gate line, when the gate line loads gate opening signals, data signals transmitted on the data line electrically connected with the thin film transistor in each sub-pixel p in the corresponding sub-pixel row can all be transmitted to the corresponding sub-pixel p. For example, the gates of the thin film transistors in the first row of sub-pixels p are all electrically connected with the gate line G1, the gates of the thin film transistors in the second row of sub-pixels p are all electrically connected with the gate line G2, the gates of the thin film transistors in the nth row of sub-pixels p are all electrically connected with the gate line Gn, and the remaining gates are in a similar way and will not be repeated redundantly herein.

During specific implementation, in a touch display panel with a structure of double gate lines, as shown in FIG. 7, the number of gate lines is 2 times the number of the rows of sub-pixels, and the number of data lines is 1/2 of the number of columns of sub-pixels. Exemplarily, as shown in FIG. 7, a row of sub-pixels p can also be correspondingly electrically connected with two adjacent gate lines, when one of the gate lines loads gate opening signals, the data line connected with each sub-pixel p in the odd position in the corresponding sub-pixel row can load the data signals to the sub-pixel p at the corresponding odd position, and when the other gate line loads the gate opening signals, the data line connected with each sub-pixel p in the even position in the corresponding sub-pixel row can load the signals to the sub-pixel p at the corresponding even position. For example, the first row of sub-pixels p correspond to gate lines G1 and G2, the gates of the thin film transistors in the sub-pixels p in the odd columns of the first row are electrically connected with the gate line G1, and the gates of the thin film transistors in the sub-pixels p in the even columns are electrically connected with the gate line G2. The sub-pixels p in the second row correspond to gate lines G3 and G4. The gates of the thin film transistors in the sub-pixels p in the odd columns of the second row are electrically connected with the gate line G3, and the gates of the thin film transistors in the sub-pixels p in the even columns are electrically connected with the gate line G4. The gates of the thin film transistors in the sub-pixels p in the odd columns of the 1/n row are electrically connected with a gate line Gn−1, and the gates of the thin film transistors in the sub-pixels p in the even columns are electrically connected with a gate line Gn, and the remaining gates are in a similar way and will not be repeated redundantly herein.

Gray scales generally differentiate brightness variations between the darkest to the brightest into several parts, to control screen brightness. The displayed image is generally composed of multiple pixels, generally, each pixel is composed of three sub-pixels which are respectively red, green, and blue, multiple different colors can be presented, and the light source of each sub-pixel can display different brightness levels. The gray scale represents the level of different brightness from darkest to brightest. The more layers therebetween, the more exquisite the displayed picture effect. At present, generally, the touch display panel adopts a 6 bit panel or an 8 bit panel to display images, wherein the 8 bit touch display panel can display 256 gray scales, that is, 0-255 gray scales; while the 6 bit touch display panel can display 64 gray scales, that is, 0-63 gray scales. The 8 bit touch display panel is taken as an example below for illustration.

Specifically, the reloaded picture can be a checkerboard picture. During specific implementation, the step of judging whether the acquired image data is the checkerboard picture with a default polarity mode can include: determining the arrangement mode of first image blocks and second image blocks formed by loading the image data according to the acquired image data; wherein the first image block includes at least one sub-pixel; the second image block includes at least one sub-pixel; the number of the sub-pixels contained in the first image block is the same as the number of the sub-pixels contained in the second image block; and the gray scales corresponding to the first image block differ from the gray scales corresponding to the second image block at least by 2 gray scales; and when the first image blocks and the second image blocks are all arranged alternately along the direction of rows and columns, and the polarities of the image data corresponding to each two adjacent data lines are opposite, determining the image data to be the checkerboard picture with a default polarity mode, otherwise determining the image data not to be the checkerboard picture with a default polarity mode.

As shown in FIG. 8A, FIG. 9A, FIG. 10A and FIG. 11A, some acquired image data provided in the embodiments of the present disclosure satisfy the forming of the reloaded pictures of the checkerboard pictures with a default polarity mode. In these reloaded checkerboard pictures, the first image block Q1 includes at least one sub-pixel p; the second image block Q2 includes at least one sub-pixel p; and the number of the sub-pixels contained in the first image block Q1 is the same as the number of the sub-pixels contained in the second image block Q2.

The gray scale difference required by the brightness difference visible by human eyes should be generally greater than or equal to 2 gray scales. During specific implementation, the gray scales corresponding to the first image block Q1 should differ from the gray scales corresponding to the second image block Q2 by at least 2 gray scales. In this way, the difference between brightness displayed by the first image block Q1 and brightness displayed by the second image block Q2 can be recognized by human eyes. Exemplarily, during practical applications, the gray scales corresponding to the first image block Q1 and the gray scales corresponding to the second image block Q2 can be selected from gray scales 0-255 through the above rule. Of course, the gray scales corresponding to the first image block Q1 and the gray scales corresponding to the second image block Q2 can be designed and determined according to actual application environment, which is not limited herein.

Further, during specific implementation, the gray scales corresponding to the first image block Q1 can differ from the gray scales corresponding to the second image block Q2 by 2 gray scales. The gray scales corresponding to the first image block Q1 can also differ from the gray scales corresponding to the second image block Q2 by 20 gray scales. The gray scales corresponding to the first image block Q1 can also differ from the gray scales corresponding to the second image block Q2 by 48 gray scales. The gray scales corresponding to the first image block Q1 can also differ from the gray scales corresponding to the second image block Q2 by 50 gray scales. The gray scales corresponding to the first image block Q1 can also differ from the gray scales corresponding to the second image block Q2 by 60 gray scales. Of course, the difference between the gray scales corresponding to the first image block Q1 and the gray scales corresponding to the second image block Q2 can be designed and determined according to actual application environment, which is not limited herein. The gray scales corresponding to the first image block Q1 differing from the gray scales corresponding to the second image block Q2 by at least 48 gray scales is taken as an example for illustration.

During specific implementation, in the touch display panel, FIG. 8A to FIG. 11B show the first sub-pixel column to the Qth sub-pixel column arranged along an extension direction of the gate line; and Q is a positive even number. As shown in FIG. 8A to FIG. 9B, Q can be equal to 6, then in the touch display panel, the first sub-pixel column to the sixth sub-pixel column can be arranged along an extension direction of the gate line. As shown in FIG. 10A to FIG. 11B, Q can be equal to 12, then in the touch display panel, the first sub-pixel column to the twelfth sub-pixel column can be arranged along an extension direction of the gate line. Of course, during practical applications, the number of sub-pixel columns required in the touch display panels with different sizes is different; therefore, the number of sub-pixel columns can be designed and determined according to actual application environment, which will not be limited herein.

As shown in FIG. 8A, FIG. 9A, FIG. 10A and FIG. 11A, when in the checkerboard picture constituted by the first image block Q1 and the second image block Q2, the gray scales of the first image block Q1 differ from the gray scales of the second image block Q2 by at least 48 gray scales, and the polarities of the image data loaded by two adjacent data lines are opposite, when gate opening signals are loaded to each gate line in sequence, the voltages of the image data loaded by each data line when the nth gate line loads gate opening signals until the (n+1)th gate line loads gate opening signals are simultaneously increased, that is, the voltage increase amplitude of the image data loaded by each data line when the nth gate line loads gate opening signals until the (n+1)th gate line loads gate opening signals is greater than or equal to a threshold value, then at this time, all the data lines can all be the first data lines, while the number of the second data lines is 0.

Alternatively, when gate opening signals are loaded to each gate line in sequence, the voltages of the image data loaded by each data line when the nth gate line loads gate opening signals until the (n+1)th gate line loads gate opening signals are simultaneously increased, that is, the voltage reduction amplitude of the image data loaded by each data line when the nth gate line loads gate opening signals until the (n+1)th gate line loads gate opening signals is greater than or equal to a threshold value, then at this time, all the data lines can all be the second data lines, while the number of the first data lines is 0.

In this way, it indicates that the ratio of the number of the first data lines to the number of the second data lines is less than 1/2, or the ratio of the number of the first data lines to the number of the second data lines is greater than 2, then the image data is determined to be the reloaded picture with the default polarity mode. That is to say, when the data signal is loaded, the potential coupling of the data line to the touch electrode is all positive coupling or negative coupling, then unwanted horizontal stripes are generated in the displayed image, to thereby influence the display effect.

For the above conditions, that is, when the reloaded picture is a checkerboard picture, in some implementable manners, when the image data is determined to be the checkerboard picture with a default polarity mode, when a row of sub-pixels of the touch display panel are correspondingly electrically connected with a gate line, that is, when the touch display panel adopts a single gate line structure, the data lines in the touch display panel are divided into multiple data line groups, where each data line group includes a data lines, and a is a multiple of 2.

The following manner can be adopted to adjust the polarity of the image data: the polarities of the image data loaded by the same data line group are adjusted to be the same, while the polarities of the image data loaded by two adjacent data line groups are adjusted to be opposite; where the first image block includes: 2k+1 columns of sub-pixels arranged in a row direction; and the second image block includes: 2k+1 columns of sub-pixels arranged in the row direction; and k is a positive integer.

Figures 8A, 8B:
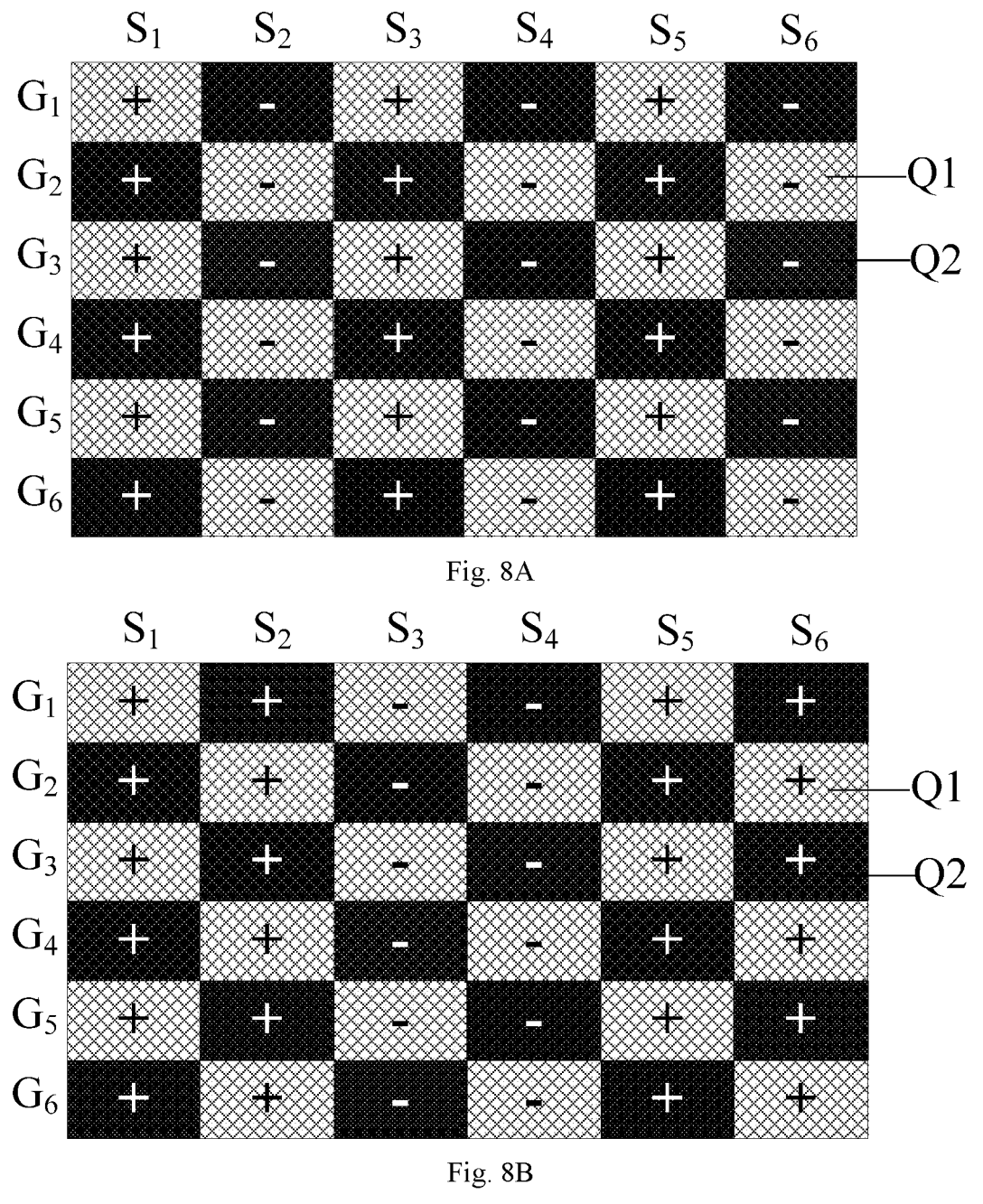

Exemplarily, as to the checkerboard picture with a single gate line as shown in FIG. 8A, gate lines $G_1$-$G_6$ load gate opening signals in sequence, when the gate line $G_1$ loads gate opening signals, data lines $S_1$-$S_6$ load image data which forms the first row of pictures; when the gate line $G_2$ loads gate opening signals, the data lines $S_1$-$S_6$ load image data which forms the second row of pictures; at this time, the image data loaded by the data lines $S_1$-$S_6$ jumps from the image data when G1 is opened to the image data when $G_2$ is opened.

If in the embodiments of the present disclosure, the first image block $Q_1$ and the second image block $Q_2$ both include a sub-pixel, the gray scales of the first image block is 127 gray scales (the corresponding image data can be ±V127), the gray scales of the second image block is 0 gray scale, then according to the polarity of the image data as shown in FIG. 8A, when $G_1$ is closed and $G_2$ is opened, the image data loaded by the data lines $S_1$, $S_3$ and $S_5$ changes from +V127 to 0, the image data loaded by data lines $S_2$, $S_4$ and $S_6$ changes from 0 to −V127, and the voltages of the image data loaded by data lines $S_1$-$S_6$ all show a tendency to decrease substantially, then data lines $S_1$-$S_6$ can serve as second data lines, and at this time, the number of the first data line is 0. Then at this time, the coupling effect of each data line to the touch electrode arranged above the data line is toward a direction in which the potential decreases, such that the touch electrode cannot recover timely to a reference potential and horizontal stripes are displayed.

The remaining is in a similar manner. When $G_2$ is closed and $G_3$ is opened, the voltages of the image data loaded by data lines $S_1$-$S_6$ all show a tendency to increase substantially, then data lines $S_1$-$S_6$ can serve as first data lines, and at this time, the number of the second data lines is 0. When $G_3$ is closed and $G_4$ is opened, the voltages of the image data loaded by data lines $S_1$-$S_6$ all show a tendency to decrease substantially, then data lines $S_1$-$S_6$ can serve as second data lines, and at this time, the number of the first data lines is 0. When $G_4$ is closed and $G_5$ is opened, the voltages of the image data loaded by data lines $S_1$-$S_6$ all show a tendency to increase substantially, then data lines $S_1$-$S_6$ can serve as first data lines, and at this time, the number of the second data lines is 0. When $G_5$ is closed and $G_6$ is opened, the voltages of the image data loaded by data lines $S_1$-$S_6$ all show a tendency to decrease substantially, then data lines $S_1$-$S_6$ can serve as second data lines, and at this time, the number of the first data lines is 0. Therefore, at this time, the image data loaded by the data lines will generate the above horizontal stripes during each jump, thereby seriously influencing the display effect.

In view of this, in the embodiments of the present disclosure, for the checkerboard picture as shown in FIG. 8A, the polarities of the image data loaded by data lines can be adjusted, such that the polarities of the image data loaded by the same data line group are the same, and the polarities of the image data loaded by two adjacent data line groups are opposite, where each data line group can include even-numbered data lines.

As shown in FIG. 8B, each data line group can include 2 data lines, that is, data lines $S_1$ and $S_2$ can serve as a data line group, the polarity of the loaded image data is positive; the data lines $S_3$ and $S_4$ serve as a data line group, and the polarity of the loaded image data is negative; the data lines $S_5$ and $S_6$ serve as a data line group, and the polarity of the loaded image data is positive. At this time, when $G_1$ is closed and $G_2$ is opened, $G_3$ is closed and $G_4$ is opened, $G_5$ is closed and $G_6$ is opened, the voltages of the image data loaded by data lines $S_1$, $S_4$ and $S_5$ tend to decrease, while the voltages of the image data loaded by data lines $S_2$, $S_3$ and $S_6$ tend to increase; when $G_2$ is closed and $G_3$ is opened, $G_4$ is closed and $G_5$ is opened, the voltages of the image data loaded by data lines $S_1$, $S_4$ and $S_5$ tend to increase, while the voltages of the image data loaded by data lines $S_2$, $S_3$ and $S_6$ tend to decrease, therefore, the number of the data lines with the voltage of image data loaded each time tending to decrease can be kept consistent with the number of data lines with the voltage of image data loaded each time tending to increase, such that the coupling effect of these data lines to the touch electrode arranged above the data lines is respectively toward the directions in which the reference potential increases and decreases, and the overall coupling degree is balanced, thereby avoiding generation of horizontal stripes.

Of course, during specific implementation, when the touch display panel adopts a single gate line structure, the number of sub-pixels in the first image block and the second image block can also be 3, moreover, the sub-pixels in the first image block are adjacent along a row direction, and the sub-pixels in the second image block are adjacent along a row direction. Of course, the number of the sub-pixels in the first image block and the second image block can also be multiple, which is not defined herein.

Exemplarily, as to the checkerboard picture with a single gate line as shown in FIG. 9A, the first image block Q1 and the second image block Q2 both include two sub-pixels, that is, the number of the sub-pixels in the first image block Q1 and the second image block Q2 is both two, and the sub-pixels in the first image block and the second image block are arranged along an extension direction of the data line. The gray scales of the first image block is 127 gray scales (the corresponding image data can be ±V127), the gray scales of the second image block is 0 gray scale, then according to the polarity of the image data as shown in FIG. 9A, when $G_2$ is closed and $G_3$ is opened, the image data loaded by the data lines $S_1$, $S_3$ and $S_5$ changes from +V127 to 0, the image data loaded by data lines $S_2$, $S_4$ and $S_6$ changes from 0 to −V127, and the voltages of the image data loaded by data lines $S_1$-$S_6$ all show a tendency to decrease substantially, then data lines $S_1$-$S_6$ can serve as second data lines, and at this time, the number of the first data lines is 0. When $G_4$ is closed and $G_5$ is opened, the image data loaded by the data lines $S_1$, $S_3$ and $S_5$ changes from 0 to +V127, the image data loaded by data lines $S_2$, $S_4$ and $S_6$ changes from −V127 to 0, and the voltages of the image data loaded by data lines $S_1$-$S_6$ all show a tendency to increase substantially, then data lines $S_1$-$S_6$ can serve as first data lines, and at this time, the number of the second data lines is 0. Therefore, the coupling effect of each data line to the touch electrode arranged above the data line is toward a direction in which the potential decreases or increases, such that the touch electrode cannot recover timely to a reference potential, and horizontal stripes are displayed.

In view of this, in the embodiments of the present disclosure, for the checkerboard picture as shown in FIG. 9A, the polarities of the image data loaded by data lines can be adjusted, such that the polarities of the image data loaded by the same data line group are the same, and the polarities of the image data loaded by two adjacent data line groups are opposite, where each data line group can include even-numbered data lines.

As shown in FIG. 9B, each data line group can include 2 data lines, data lines $S_1$ and $S_2$ can serve as a data line group, the polarity of the loaded image data is positive; the data lines $S_3$ and $S_4$ serve as a data line group, and the polarity of the loaded image data is negative; the data lines $S_5$ and $S_6$ serve as a data line group, and the polarity of the loaded image data is positive. At this time, when $G_2$ is closed and $G_3$ is opened, the voltages of the image data loaded by data lines $S_1$, $S_4$ and $S_5$ tend to decrease, while the voltages of the image data loaded by data lines $S_2$, $S_3$ and $S_6$ tend to increase; when $G_4$ is closed and $G_5$ is opened, the voltages of the image data loaded by data lines $S_1$, $S_4$ and $S_5$ tend to increase, while the voltages of the image data loaded by data lines $S_2$, $S_3$ and $S_6$ tend to decrease, therefore, the number of the data lines with the voltage of image data loaded each time tending to decrease can be kept consistent with the number of data lines with the voltage of image data loaded each time tending to increase, such that the coupling effect of these data lines to the touch electrode arranged above the data lines is respectively toward the directions in which the reference potential increases and decreases, and the overall coupling degree is balanced, thereby avoiding generation of horizontal stripes.

In some other implementable manners, when the image data is determined to be the checkerboard picture with a default polarity mode, when a row of sub-pixels of the touch display panel are correspondingly electrically connected with two adjacent gate lines, that is, when the touch display panel adopts a structure with double gate lines, the data lines in the touch display panel are divided into multiple data line groups, where each data line group includes b data lines, and b is a multiple of 2. The following manner can be adopted to adjust the polarity of the image data: the polarities of the image data loaded by the same data line group are adjusted to be the same, while the polarities of the image data loaded by two adjacent data line groups are adjusted to be opposite; where the first image block includes: 2y columns of sub-pixels arranged in a row direction; and the second image block includes: 2y columns of sub-pixels arranged in the row direction; and y is a positive integer.

Figures 10A, 10B, 11A:
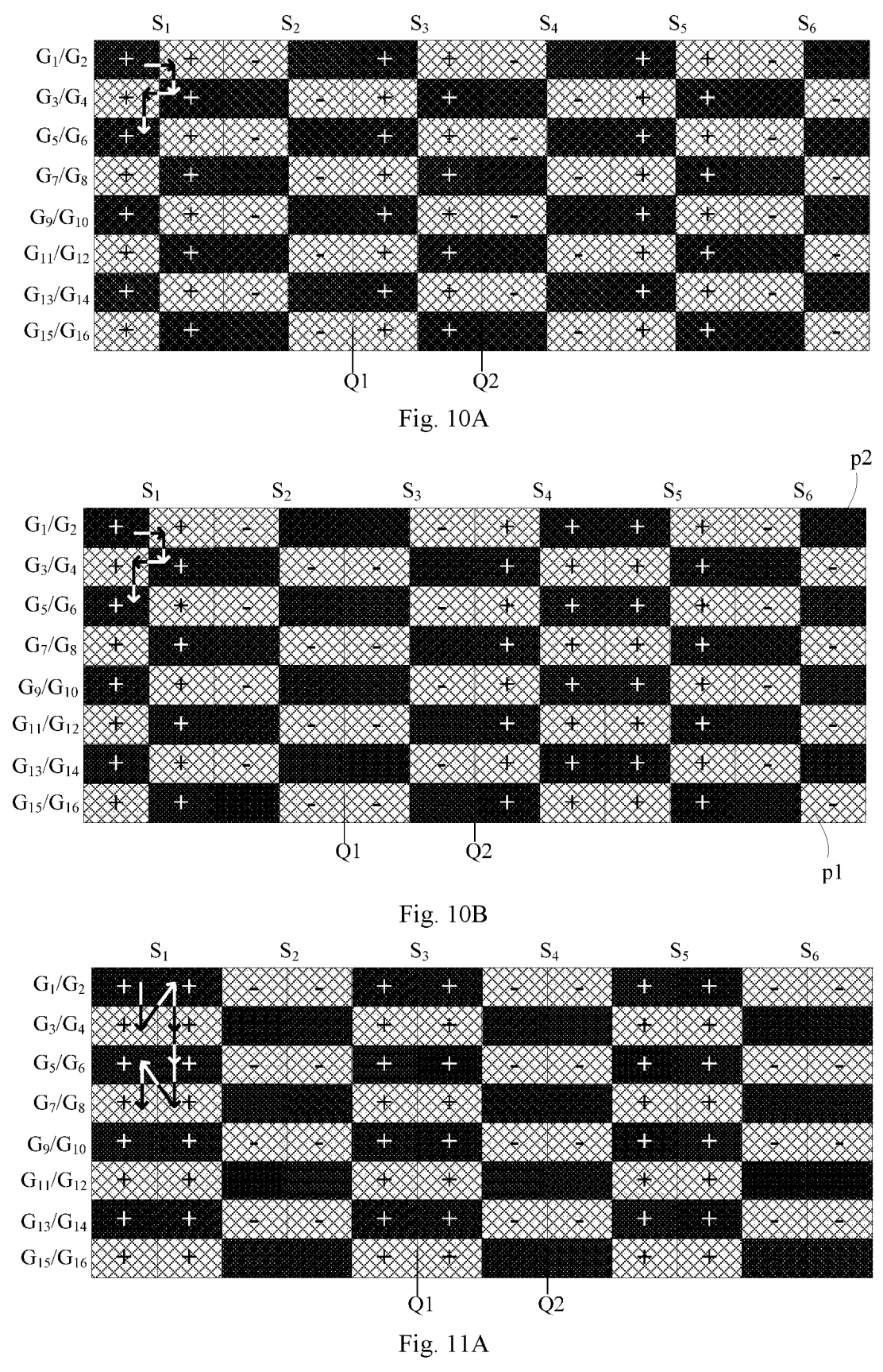

Exemplarily, as to the checkerboard picture with double gate lines as shown in FIG. 10A, the first image block Q1 and the second image block Q2 both include two sub-pixels in a row, that is, the first image block Q1 and the second image block Q2 both include 2 columns of sub-pixels, the number of the sub-pixels in the first image block Q1 and the second image block Q2 is both two, and the sub-pixels in the first image block and the second image block are arranged along an extension direction of the gate line. The gray scales of the first image block Q1 are 127 gray scales (the corresponding image data may be ±V127), the gray scales of the second image block Q2 are 0 gray scale, the direction of the arrow shown in FIG. 10A is the loading sequence of image data, according to the loading sequence of FIG. 10A, with the changing rule of image data when $G_1$ is closed and $G_2$ is opened as an example, the changing rule of data at other moments is similar to the above changing rule, and will not be repeated redundantly herein. When $G_1$ is closed and $G_2$ is opened, the image data loaded by the data lines $S_1$-$S_6$ all show a tendency to increase substantially, then data lines $S_1$-$S_6$ can serve as first data lines, and at this time, the number of the second data lines is 0. Then at this time, the coupling effect of each data line to the touch electrode arranged above the data line is toward a direction in which the potential increases, such that the touch electrode cannot recover timely to a reference potential, and horizontal stripes are displayed.

In view of this, in the embodiments of the present disclosure, for the checkerboard picture as shown in FIG. 10A, the polarities of the image data loaded by data lines can be adjusted, such that the polarities of the image data loaded by the same data line group are the same, and the polarities of the image data loaded by two adjacent data line groups are opposite, where the number of data lines included in each data line group is a multiple of 2.

As shown in FIG. 10B, each data line group can include 2 data lines, data lines $S_2$ and $S_3$ can serve as a data line group, the polarity of the loaded image data is negative; the data lines $S_4$ and $S_5$ serve as a data line group, and the polarity of the loaded image data is positive. At this time, when $G_1$ is closed and $G_2$ is opened, the voltages of the image data loaded by data lines $S_2$ and $S_5$ tend to increase, while the voltages of the image data loaded by data lines $S_3$ and $S_4$ tend to decrease, therefore, the number of the data lines with the voltage of image data loaded each time tending to decrease can be kept consistent with the number of data lines with the voltage of image data loaded each time tending to increase, such that the coupling effect of these data lines to the touch electrode arranged above the data lines is respectively toward the directions in which the reference potential increases and decreases, and the overall coupling degree is balanced, thereby avoiding generation of horizontal stripes.

Moreover, as shown in FIG. 10B, two adjacent columns from the second sub-pixel column to the (Q−1)th sub-pixel column are divided into a first sub-pixel column group, and each first sub-pixel column group includes the first image blocks and the second image blocks which are arranged alternately along a column direction; and the first sub-pixel column and the Qth sub-pixel column are respectively composed of first sub-pixels and second sub-pixels which are arranged alternately; where the gray scales corresponding to the first sub-pixel is roughly the same as the gray scales corresponding to the first image block, the gray scales corresponding to the second sub-pixel is roughly the same as the gray scales corresponding to the second image block, the first sub-pixel is adjacent to the second image block in the row direction, and the second sub-pixel is adjacent to the first image block in the row direction.

For example, as shown in FIG. 10B, the gray scales corresponding to the first sub-pixel p1 are 127 gray scales, the gray scale corresponding to the second sub-pixel p2 is 0 gray scale, and the first sub-pixel column and the twelfth sub-pixel column include respectively the first sub-pixels p1 and the second sub-pixels p2 which are arranged alternately.

Moreover, two adjacent columns from the second sub-pixel column to the eleventh sub-pixel column are divided into a first sub-pixel column group, and each first sub-pixel column group includes the first image blocks and the second image blocks which are arranged alternately along a column direction.

For example, the second sub-pixel column and the third sub-pixel column are divided into a first sub-pixel column group, the fourth sub-pixel column and the fifth sub-pixel column are divided into a first sub-pixel column group, the sixth sub-pixel column and the seventh sub-pixel column are divided into a first sub-pixel column group, and the remaining sub-pixel columns are divided in a similar manner. Moreover, these first sub-pixel column groups include the first image blocks Q1 and the second image blocks Q2 which are arranged alternately along a column direction. Also, the first sub-pixels p1 are adjacent to the second image block Q2 in the row direction, and the second sub-pixels p2 are adjacent to the first image block Q1 in the row direction.

Exemplarily, as to the checkerboard picture with double gate lines as shown in FIG. 11A, the first image block Q1 and the second image block Q2 both include two sub-pixels in a row, that is, the first image block Q1 and the second image block Q2 both include 2 columns of sub-pixels, the number of the sub-pixels in the first image block Q1 and the second image block Q2 is both two, and the sub-pixels in the first image block and the second image block are arranged along an extension direction of the gate line. The gray scales of the first image block Q1 are 127 gray scales (the corresponding image data can be ±V127), the gray scale of the second image block Q2 is 0 gray scale, the direction of the arrow shown in FIG. 11A is the loading sequence of image data, according to the loading sequence of FIG. 11A, with the changing rule of image data when $G_2$ is closed and $G_3$ is opened as an example, the changing rule of data at other moments is similar to the above changing rule, and will not be repeated redundantly herein. When $G_2$ is closed and $G_3$ is opened, the image data loaded by the data lines $S_1$-$S_6$ all show a tendency to increase substantially, then data lines $S_1$-$S_6$ can serve as first data lines, and at this time, the number of the second data line is 0. Then at this time, the coupling effect of each data line to the touch electrode arranged above the data line is toward a direction in which the potential increases, such that the touch electrode cannot recover timely to a reference potential, and horizontal stripes are displayed.

In view of this, in the embodiments of the present disclosure, for the checkerboard picture as shown in FIG.

11A, the polarities of the image data loaded by data lines can be adjusted, such that the polarities of the image data loaded by the same data line group are the same, and the polarities of the image data loaded by two adjacent data line groups are opposite, where the number of data lines included in each data line group is a multiple of 2.

Figures 11B, 12A, 12B:
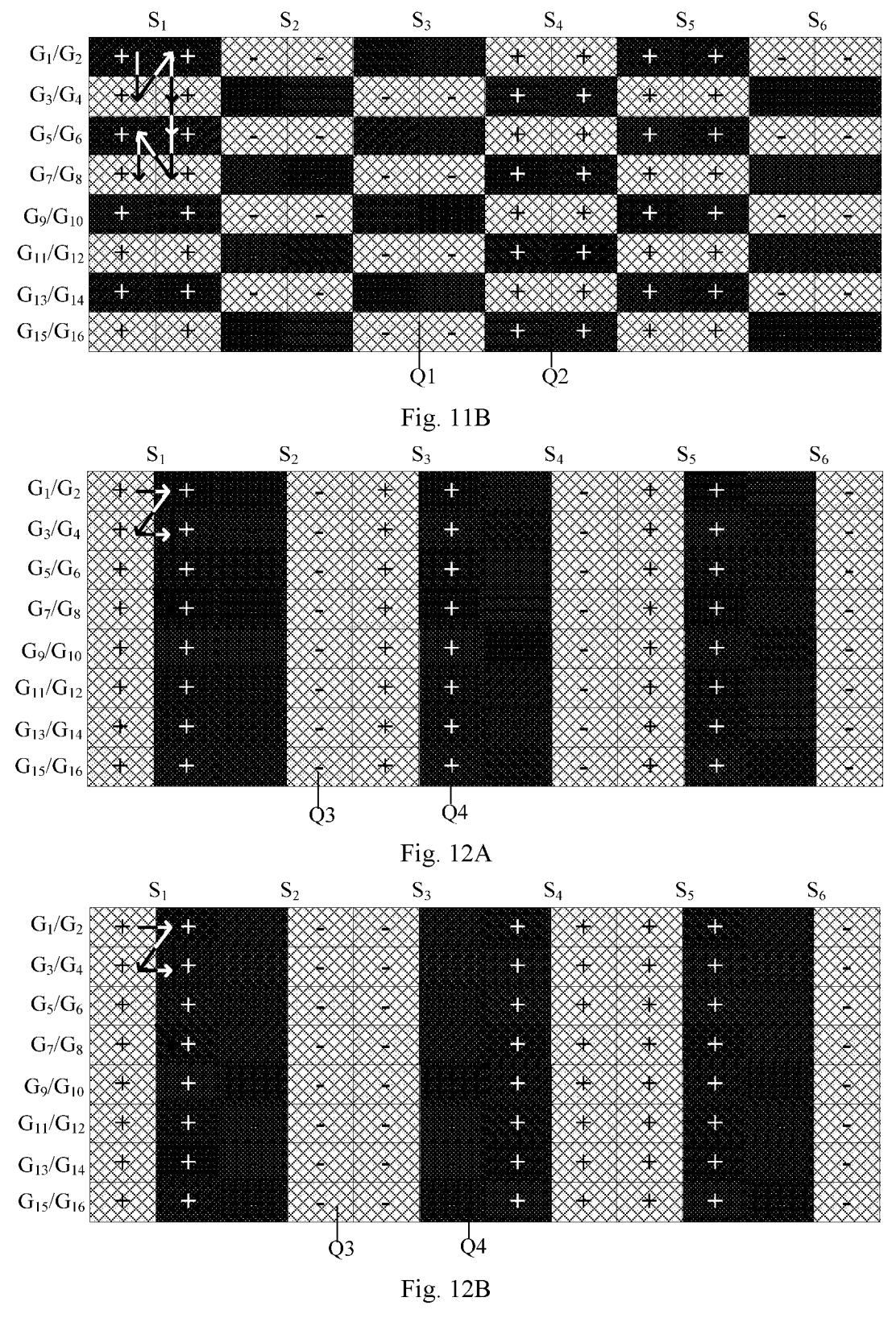

As shown in FIG. 11B, each data line group can include 2 data lines, data lines $S_2$ and $S_3$ can serve as a data line group, the polarity of the loaded image data is negative; the data lines $S_4$ and $S_5$ serve as a data line group, and the polarity of the loaded image data is positive. At this time, when $G_2$ is closed and $G_3$ is opened, the voltages of the image data loaded by data lines $S_2$ and $S_5$ tend to increase, while the voltages of the image data loaded by data lines $S_3$ and $S_4$ tend to decrease, therefore, the number of the data lines with the voltage of image data loaded each time tending to decrease can be kept consistent with the number of data lines with the voltage of image data loaded each time tending to increase, such that the coupling effect of these data lines to the touch electrode arranged above the data lines is respectively toward the directions in which the reference potential increases and decreases, and the overall coupling degree is balanced, thereby avoiding generation of horizontal stripes.

Moreover, as shown in FIG. 11B, two adjacent columns from the first sub-pixel column to the Qth sub-pixel column are divided into a second sub-pixel column group, and each second sub-pixel column group is composed of the first image blocks and the second image blocks which are arranged alternately along a column direction.

Exemplarily, the first sub-pixel column and the second sub-pixel column can be divided into a second sub-pixel column group, the third sub-pixel column and the fourth sub-pixel column are divided into a second sub-pixel column group, the fifth sub-pixel column and the sixth sub-pixel column are divided into a second sub-pixel column group, the seventh sub-pixel column and the eighth sub-pixel column are divided into a second sub-pixel column group, the ninth sub-pixel column and the tenth sub-pixel column are divided into a second sub-pixel column group, the eleventh sub-pixel column and the twelfth sub-pixel column are divided into a second sub-pixel column group. Moreover, each second sub-pixel column group includes the first image blocks Q1 and the second image blocks Q2 which are arranged alternately along a column direction.

Of course, during specific implementation, when the touch display panel adopts a structure with double gate lines, the first image block Q1 and the second image block Q2 can also have four columns of sub-pixels, the number of sub-pixels in each column is one or multiple. Of course, the number of sub-pixels in the first image block and the second image block can also be multiple, which is not limited herein.

Further, the reloaded picture includes: a striped picture. During specific implementation, the step of judging whether the acquired image data is the striped picture with a default polarity mode can include: determining the arrangement mode of third image blocks and fourth image blocks formed by loading the image data according to the acquired image data; where the third image block and the fourth image block both at least include at least two sub-pixels, and the gray scales corresponding to the third image block differ from the gray scales corresponding to the fourth image block at least by 2 gray scales; and when the third image blocks are arranged into multiple columns along a row direction, the fourth image blocks are arranged into multiple columns along the row direction, the third image block columns and the fourth image block columns are arranged alternately along the row direction, and the polarities of the image data corresponding to each two adjacent data lines are opposite, determining the image data to be the striped picture with a default polarity mode, otherwise determining the image data not to be the striped picture with a default polarity mode.

Exemplarily, as shown in FIG. 12A, some acquired image data provided in the embodiments of the present disclosure satisfy the forming of the reloading picture of a striped picture with a default polarity mode. In the reloaded striped picture, the third image block Q3 and the fourth image block Q4 both include at least two sub-pixels, and the gray scales corresponding to the third image block Q3 differ from the gray scales corresponding to the fourth image block Q4 at least by 2 gray scales.

The gray scale difference required by the brightness difference visible by human eyes should be generally greater than or equal to 2 gray scales. During specific implementation, the gray scales corresponding to the third image block Q3 should differ from the gray scales corresponding to the fourth image block Q4 by at least 2 gray scales. In this way, the difference between brightness displayed by the third image block Q3 and the brightness displayed by the fourth image block Q4 can be recognized by human eyes. Exemplarily, during practical applications, the gray scales corresponding to the third image block Q3 and the gray scales corresponding to the fourth image block Q4 can be selected from gray scales 0-255 through the above rule. Of course, the gray scales corresponding to the third image block Q3 and the gray scales corresponding to the fourth image block Q4 can be designed and determined according to actual application environment, which is not limited herein.

Further, during specific implementation, the gray scales corresponding to the third image block Q3 can differ from the gray scales corresponding to the fourth image block Q4 by 2 gray scales. The gray scales corresponding to the third image block Q3 can also differ from the gray scales corresponding to the fourth image block Q4 by 20 gray scales. The gray scales corresponding to the third image block Q3 can also differ from the gray scales corresponding to the fourth image block Q4 by 48 gray scales. The gray scales corresponding to the third image block Q3 can also differ from the gray scales corresponding to the fourth image block Q4 by 50 gray scales. The gray scales corresponding to the third image block Q3 can also differ from the gray scales corresponding to the fourth image block Q4 by 60 gray scales. Of course, the difference between the gray scales corresponding to the third image block Q3 and the gray scales corresponding to the fourth image block Q4 can be designed and determined according to actual application environment, which is not limited herein. The gray scales corresponding to the third image block Q3 differing from the gray scales corresponding to the fourth image block Q4 by at least 48 gray scales is taken as an example for illustration below.

Exemplarily, as shown in FIG. 12A, when in the striped picture constituted by the third image block Q3 and the fourth image block Q4, the gray scales of the third image block Q3 differ from the gray scales of the fourth image block Q4 by at least 48 gray scales, and the polarities of the image data loaded by two adjacent data lines are opposite, when gate opening signals are loaded to each gate line in sequence, the voltages of the image data loaded by each data line when the nth gate line loads gate opening signals until the (n+1)th gate line loads gate opening signals are simultaneously increased or simultaneously decreased, then at this time, all the data lines can be the first data lines, while the number of the second data lines is 0. Or, all the data lines can be the second data lines, while the number of the first data lines is 0, then the potential coupling of the data line to the touch electrode when the data line loads data signals is all positive coupling or negative coupling, then according to the reason of the generation of horizontal stripes, when the loaded image data satisfies such a first rule, unwanted horizontal stripes are generated in the displayed image, thereby influencing the display effect.

For the above conditions, that is, when the reloaded picture is a striped picture, in some implementable manners, when the image data is determined to be the striped picture with a default polarity mode, when a row of sub-pixels of the touch display panel are correspondingly electrically connected with two adjacent gate lines, that is, when the touch display panel adopts a structure with double gate lines, the data lines in the touch display panel are divided into multiple data line groups, where each data line group includes c data lines, and c is a multiple of 2.

The following manner can be adopted to adjust the polarity of the image data: the polarities of the image data loaded by the same data line group are adjusted to be the same, while the polarities of the image data loaded by two adjacent data line groups are adjusted to be opposite; where the third image block can include 2m columns of sub-pixels arranged in a row direction, and the fourth image block includes 2m columns of sub-pixels arranged in the row direction, and m is an odd number.

Exemplarily, as to the striped picture displayed by a touch display panel with double gate lines as shown in FIG. 12A, the third image block Q3 and the fourth image block Q4 both include two columns of sub-pixels, moreover, two columns of sub-pixels in the third image block Q3 and the fourth image block Q4 are arranged in a row direction and adjacent to each other. Wherein, the gray scales of the third image block Q3 are 127 gray scales (the corresponding image data can be ±V127), the gray scale of the fourth image block Q4 is 0 gray scale, the direction of the arrow shown in FIG. 12A is the loading sequence of image data, according to the loading sequence of FIG. 12A, with the changing rule of image data when $G_1$ is closed and $G_2$ is opened as an example, the changing rule of data at other moments is similar to the above changing rule, and will not be repeated redundantly herein. When $G_1$ is closed and $G_2$ is opened, the voltages of the image data loaded by the data lines $S_1$-$S_6$ all show a tendency to decrease substantially, then data lines $S_1$-$S_6$ can serve as second data lines, and at this time, the number of the first data lines is 0. Then at this time, the coupling effect of each data line to the touch electrode arranged above the data line is toward a direction in which the potential decreases, such that the touch electrode cannot recover timely to a reference potential, and horizontal stripes are displayed.

In view of this, in the embodiments of the present disclosure, for the striped picture as shown in FIG. 12A, the polarities of the image data loaded by data lines can be adjusted, such that the polarities of the image data loaded by the same data line group are the same, and the polarities of the image data loaded by two adjacent data line groups are opposite, where the number of data lines included in each data line group is a multiple of 2.

As shown in FIG. 12B, each data line group can include 2 data lines, data lines $S_2$ and $S_3$ can serve as a data line group, the polarity of the loaded image data is negative; the data lines $S_4$ and $S_5$ serve as a data line group, and the polarity of the loaded image data is positive. At this time, when $G_1$ is closed and $G_2$ is opened, the voltages of the image data loaded by data lines $S_2$ and $S_5$ tend to decrease, while the voltages of the image data loaded by data lines $S_3$ and $S_4$ tend to increase, therefore, the number of the data lines with the voltage of image data loaded each time tending to decrease can be kept consistent with the number of data lines with the voltage of image data loaded each time tending to increase, such that the coupling effect of these data lines to the touch electrode arranged above the data lines is respectively toward the directions in which the reference potential increases and decreases, and the overall coupling degree is balanced, thereby avoiding generation of horizontal stripes.

During specific implementation, in the touch display panel, FIG. 12A and FIG. 12B show the first sub-pixel column to the Pth sub-pixel column arranged along an extension direction of the gate line; and P is a positive even number. As shown in FIG. 12A and FIG. 12B, P can be equal to 12, then in the touch display panel, the first sub-pixel column to the twelfth sub-pixel column can be arranged along an extension direction of the gate line. Of course, during practical applications, the number of sub-pixel columns required in touch display panels of different sizes is different, therefore, the number of sub-pixel columns can be designed and determined according to actual application environment, which is not defined herein.

Exemplarily, the second sub-pixel column to the (P−1)th sub-pixel column can be composed of the arranged third image blocks and fourth image blocks, moreover, the gray scales corresponding to the sub-pixels in the first sub-pixel column are the same, and the gray scales corresponding to the sub-pixels in the Pth sub-pixel column are the same, where the third image block includes two adjacent columns of sub-pixels arranged in the row direction, the fourth image block includes two adjacent columns of sub-pixels arranged in the row direction, the gray scales corresponding to the first sub-pixel column are different from the gray scales corresponding to the second sub-pixel column, and the gray scales corresponding to the Pth sub-pixel column are different from the gray scales corresponding to the (P−1)th sub-pixel column.

Exemplarily, as shown in FIG. 12B, the gray scales corresponding to the sub-pixels in the first sub-pixel column are the same, and the gray scales corresponding to the sub-pixels in the twelfth sub-pixel column are the same. The third image block Q3 includes two adjacent columns of sub-pixels arranged in the row direction, the fourth image block Q4 includes two adjacent columns of sub-pixels arranged in the row direction, and the third image blocks Q3 and the fourth image blocks Q4 are arranged alternately along a row direction to form the second sub-pixel column to the (P−1)th sub-pixel column. Moreover, the gray scales corresponding to the first sub-pixel column are different from the gray scales corresponding to the second sub-pixel column, and the gray scales corresponding to the twelfth sub-pixel column are different from the gray scales corresponding to the eleventh sub-pixel column. Further, the gray scales corresponding to the sub-pixels in the first sub-pixel column, the twelfth sub-pixel column and the third image block Q3 can be roughly the same.

Of course, the requirements on the third image block Q3 and the fourth image block Q4 in the touch display panel used in different application environments can be different, therefore, the number of sub-pixel columns contained in the third image block Q3 and the fourth image block Q4 can be designed and determined according to actual application environments, which will not be defined herein.

Figure 13A:
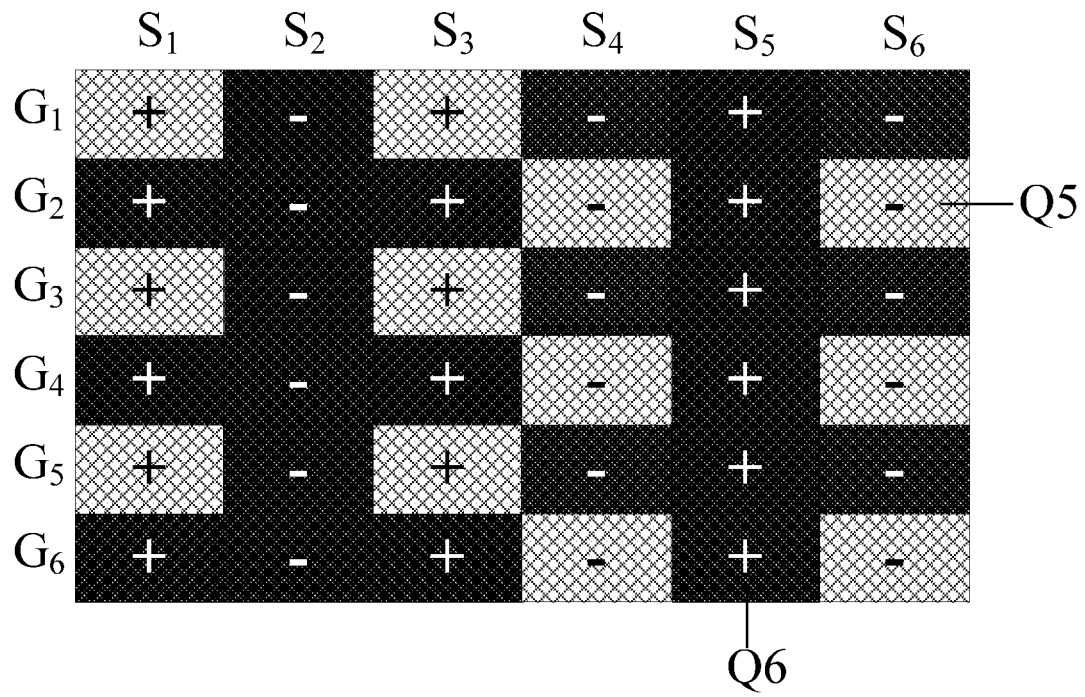
FIG. 13A is a first schematic diagram of a reloaded picture satisfying a third rule provided in an embodiment of the present disclosure.

In addition to the above implementation manners, during practical applications, the conditions shown in FIG. 13A and FIG. 14A may also occur, only part of the sub-pixels are used to display the checkerboard picture, while part of the pictures load striped pictures, or the loaded image data is not changed, but still horizontal stripes may be caused. For such a reloaded picture, for example, a mixed picture including a checkerboard picture and a striped picture, the polarity adjustment on the image data can include: adjusting the number of the first data lines and the number of the second data lines to be roughly the same when determining the image data to be the mixed picture with a default polarity mode.

Exemplarily, when the image data is determined to be the mixed picture with a default polarity mode, the number of the first data lines can be adjusted to be the same as the number of the second data lines, that is, the ratio of the number of the first data lines to the number of the second data lines is equal to 1. Or, the number of the first data lines and the second data lines after adjustment can also be adjusted such that the ratio of the number of the first data lines to the number of the second data lines is within a range of 1/2-2.

For example, the number of the first data lines and the second data lines after adjustment can be adjusted such that the ratio of the number of the first data lines to the number of the second data lines can be 2/3 or 3/4 or 3/2 or 4/3, etc., in this way, the first data line and the second data line can tend to be the same, such that the existence of the above horizontal stripes cannot be easily observed by human eyes. Of course, during practical applications, the number of the first data lines and the number of the second data lines after adjustment can be designed and determined according to actual application environment, which is not limited herein.

For example, in the structure with a single gate line as shown in FIG. 13A, data lines $S_1$, $S_3$, $S_4$ and $S_6$ load constantly changing image data for image display, while data lines $S_2$ and $S_5$ do not load image data. If the gray scales of the fifth image block Q5 formed by image data are 127 gray scales (the corresponding image data can be ±V127), the gray scale of the sixth image block Q6 is 0 gray scale, then when $G_1$ is closed and $G_2$ is opened, $G_3$ is closed and $G_4$ is opened, $G_5$ is closed and $G_6$ is opened, the voltages of the image data loaded by data lines $S_1$, $S_3$, $S_4$ and $S_6$ tend to decrease substantially, then at this time, the coupling effect of each data line to the touch electrode arranged above the data line is toward a direction in which the potential decreases. When $G_2$ is closed and $G_3$ is opened, $G_4$ is closed and $G_5$ is opened, the voltages of the image data loaded by data lines $S_1$, $S_3$, $S_4$ and $S_6$ tend to increase substantially, then at this time, the coupling effect of each data line to the touch electrode arranged above the data line is toward a direction in which the potential decreases. At this time, the image data loaded by the data lines will generate the above horizontal stripes during each jump, thereby seriously influencing the display effect.

Figure 13B:
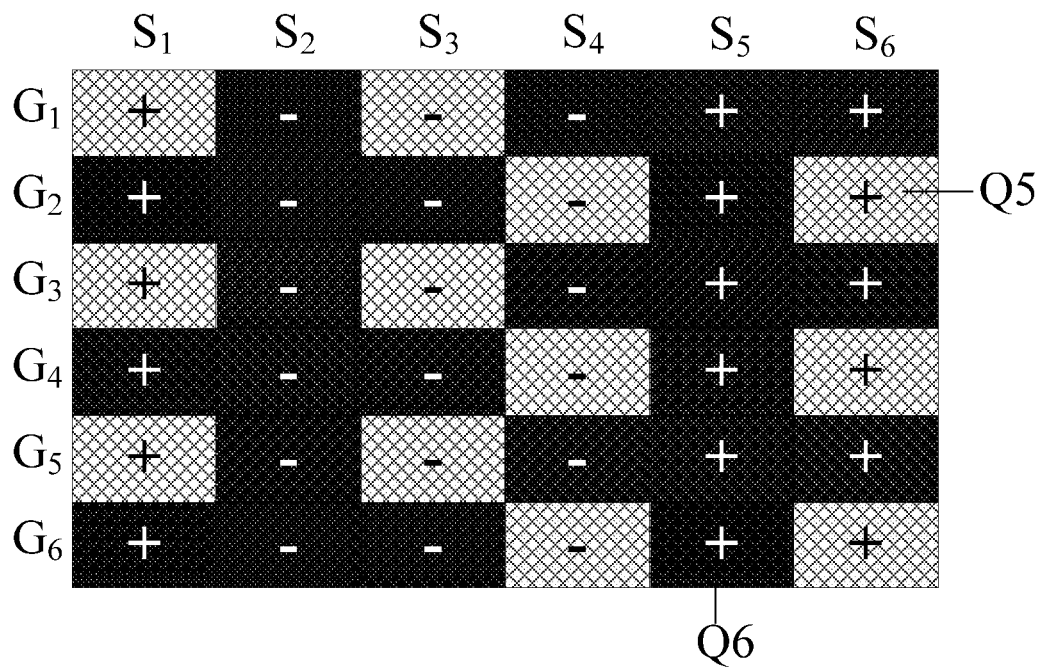
FIG. 13B is a schematic diagram of a reloaded picture after

In view of this, in the embodiments of the present disclosure, for the reloaded picture shown in FIG. 13A, the polarity of the image data loaded by data lines can be adjusted. As shown in FIG. 13B, the polarity of the image data corresponding to the data line $S_3$ can be adjusted to be negative, and the polarity of the image data corresponding to the data line $S_6$ can be adjusted to be positive. At this time, when $G_1$ is closed and $G_2$ is opened, $G_3$ is closed and $G_4$ is opened, $G_5$ is closed and $G_6$ is opened, the image data loaded by data lines $S_3$ and $S_6$ all tend to increase substantially, and the data lines belong to two first data lines; and the image data loaded by data lines $S_1$ and $S_4$ all tend to decrease substantially, and the data lines belong to two second data lines. When $G_2$ is closed and $G_3$ is opened, $G_4$ is closed and $G_5$ is opened, the voltages of the image data loaded by data lines $S_1$ and $S_4$ all tend to increase substantially, and the data lines belong to two first data lines; and voltages of the image data loaded by data lines $S_3$ and $S_6$ all tend to decrease substantially, and the data lines belong to two second data lines. In this way, the number of the first data lines is the same as the number of the second data lines when image data is loaded each time, the number of the data lines with the voltage of image data loaded each time tending to decrease can be kept consistent with the number of data lines with the voltage of image data loaded each time tending to increase, such that the coupling effect of these data lines to the touch electrode arranged above the data lines is respectively toward the directions in which the reference potential increases and decreases, and the overall coupling degree is balanced, thereby avoiding generation of horizontal stripes.

In the structure with a single gate line as shown in FIG. 14A, data lines $S_1$ and $S_4$ load constantly changing image data for image display, while data lines $S_2$, $S_3$, $S_5$ and $S_6$ do not load image data. If the gray scales of the fifth image block Q5 formed by image data are 127 gray scales (the corresponding image data can be ±V127), the gray scale of the sixth image block Q6 is 0 gray scale, then when $G_1$ is closed and $G_2$ is opened, $G_3$ is closed and $G_4$ is opened, $G_5$ is closed and $G_6$ is opened, the image data loaded by data lines $S_1$ and $S_4$ tend to decrease substantially, then at this time, the coupling effect of each data line to the touch electrode arranged above the data line is toward a direction in which the potential decreases. When $G_2$ is closed and $G_3$ is opened, $G_4$ is closed and $G_5$ is opened, the voltages of the image data loaded by data lines $S_1$ and $S_4$ tend to increase substantially, then at this time, the coupling effect of each data line to the touch electrode arranged above the data line is toward a direction in which the potential decreases. At this time, the image data loaded by the data lines will generate the above horizontal stripes during each jump, thereby seriously influencing the display effect.

In view of this, in the embodiments of the present disclosure, for the reloaded picture shown in FIG. 14A, the polarity of the image data loaded by data lines can be adjusted. As shown in FIG. 14B, the polarity of the image data corresponding to the data line $S_4$ can be adjusted to be positive. At this time, when $G_1$ is closed and $G_2$ is opened, $G_3$ is closed and $G_4$ is opened, $G_5$ is closed and $G_6$ is opened, the image data loaded by the data line $S_4$ all tend to increase substantially, and the data line belongs to the first data line; and the image data loaded by the data line $S_1$ all tend to decrease substantially, and the data line belongs to the second data line. When $G_2$ is closed and $G_3$ is opened, $G_4$ is closed and $G_5$ is opened, the voltages of the image data loaded by the data line $S_1$ all tend to increase substantially, and the data line belongs to the first data line; and voltages of the image data loaded by the data line $S_4$ all tend to decrease substantially, and the data line belongs to the second data line. In this way, the number of the first data lines is the same as the number of the second data lines when image data is loaded each time, the number of the data lines with the voltage of image data loaded each time tending to decrease can be kept consistent with the number of data lines with the voltage of image data loaded each time tending to increase, such that the coupling effect of these data lines to the touch electrode arranged above the data lines is respectively toward the directions in which the reference potential increases and decreases, and the overall coupling degree is balanced, thereby avoiding generation of horizontal stripes.

Figure 15:
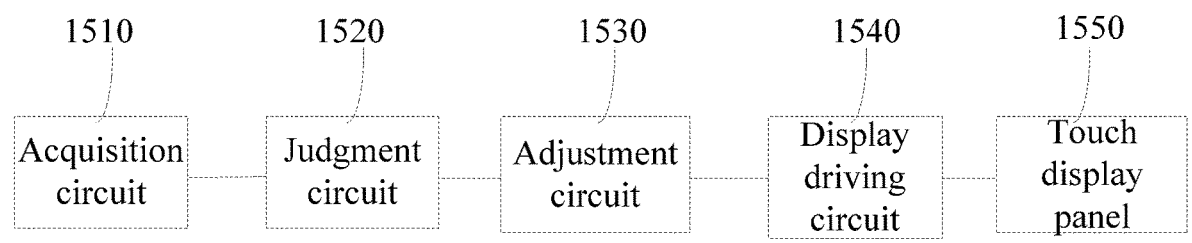
FIG. 15 is a structural schematic diagram of a driving device provided in an embodiment of the present disclosure.

Based on the same inventive concept, the embodiments of the present disclosure further provide a device for driving a touch display panel, as shown in FIG. 15, the driving device includes: an acquisition circuit 1510, configured to acquire image data of an image to be displayed; a judgment circuit 1520, configured to judge whether the acquired image data is a reloaded picture with a default polarity mode, wherein the default polarity mode includes: the polarities of image data corresponding to each two adjacent data lines are opposite, while the polarities of image data corresponding to the same data line are the same; an adjustment circuit 1530, configured to perform polarity adjustment on the image data when the image data is judged to be a reloaded picture with the default polarity mode; and a display driving circuit 1540, configured to drive the touch display panel 1550 to display image according to the image data after polarity adjustment.

During specific implementation, at least one circuit in the above acquisition circuit, the judgment circuit, the adjustment circuit and the display driving circuit can be embodied in the form of an all-hardware embodiment, an all-software embodiment or an embodiment of software and hardware in combination, which is not defined herein.

Based on the same inventive concept, the embodiments of the present disclosure further provide a display device which includes a touch display panel and the above driving device provided in the embodiments of the present disclosure. The principle for solving problems by the display device is similar to the principle of the above driving device, therefore, for the implementation of the display device, please refer to the implementation of the above driving device, and the repeated part will not be repeated redundantly herein.

During specific implementation, the display device provided in the embodiment of the present disclosure can be any product or part with a display function, such as a mobile phone, a tablet personal computer, a television, a display, a notebook computer, a digital photo frame, and a navigator. Other essential components of the display device should all be understood as being provided by those skilled in the art, will not be repeated redundantly herein, and should not be deemed as a limitation to the present disclosure.

Based on the same inventive concept, the embodiment of the present disclosure further provides a readable non-temporary storage medium which is stored with a touch display panel executable instruction, and the touch display panel executable instruction realizes the steps of the above driving method of the touch display panel provided in the embodiment of the present disclosure when the touch display panel executable instruction is executed by a processor. Specifically, the present disclosure can adopt the form of computer program products implemented on one or more usable storage media (including but not limited to a magnetic disk memory and an optical memory) which contain computer usable program codes.

Based on the same inventive concept, the embodiment of the present disclosure further provides a computer device, including a memory, a processor and computer programs stored on the memory and capable of running on the processor, and the processor realizes the steps of the above driving method of the touch display panel provided in the embodiment of the present disclosure when the processor executes programs.

As to the driving method and device of the touch display panel provided in the embodiment of the present disclosure, the image data of the displayed image is firstly acquired before image display, when the image data is the image data of a reloading picture with a default polarity mode, the image data of the reloaded picture is subjected to polarity adjustment, such that the image displayed by the adjusted image data is unchanged, and meanwhile, the potential of the touch electrode is prevented from being pulled towards the same direction and deviating from its reference voltage. In this way, when the image data after polarity adjustment is loaded, horizontal stripes can be avoided on the displayed image, thereby optimizing display effect. Moreover, in the driving method provided in the embodiment of the present disclosure, only the polarity of the image data is adjusted, and image display of the liquid crystal display panel will not be influenced, therefore, the displayed image can be the same as the image before adjustment, but the image data after adjustment will not lead to generation of displayed horizontal stripes, thereby further optimizing the display effect.

Although the preferred embodiments of the present disclosure have been described, however, those skilled in the art can make additional variations and modifications to these embodiments once they learn about the concept of basic creativity. Therefore, the appended claims are interpreted to encompass preferred embodiments and all the variations and modifications falling within the scope of the present disclosure.

Evidently those skilled in the art can make various modifications and variations to the present disclosure without departing from the spirit and scope of the present disclosure. Thus the present disclosure is also intended to encompass these modifications and variations thereto so long as the modifications and variations made to the present disclosure come into the scope of the claims appended to the present disclosure and their equivalents.

The invention claimed is:

1. A method for driving a touch display panel, comprising:
    acquiring image data of an image to be displayed;
    judging whether the acquired image data is a reloaded picture with a default polarity mode, wherein the default polarity mode comprises: polarities of the image data corresponding to each two adjacent data lines are opposite, and polarities of the image data corresponding to a same data line are the same;
    performing polarity adjustment on the image data when judging that the image data is the reloaded picture with the default polarity mode; and
    driving the touch display panel to display image according to the image data after polarity adjustment.

2. The driving method of claim 1, wherein the judging whether the acquired image data is the reloaded picture with the default polarity mode comprises:
    determining a quantity of first data lines and a quantity of second data lines loading the image data according to the acquired image data, wherein the first data lines are data lines with a voltage increase amplitude, from the image data loaded at a first moment to the image data loaded at a second moment, being greater than or equal to a threshold value; the second data lines are data lines with a voltage reduction amplitude, from the image data loaded at the first moment to the image data loaded at the second moment, being greater than or equal to the threshold value; the first moment is a moment at which an $n^{th}$ gate line loads a gate opening signal, the second moment is a moment at which an $(n+1)^{th}$ gate line loads the gate opening signal, and n is an integer greater than or equal to 1; the threshold value is a voltage difference between a first image data and a second image data which have a same polarity, and gray scales corresponding to the first image data differ from gray scales corresponding to the second image data by at least 2 gray scales; and when a ratio of the quantity of the first data lines to the quantity of the second data lines is smaller than or equal to 1/2, or when a ratio of the quantity of the first data lines to the quantity of the second data lines is greater than 2, determining the image data to be the reloaded picture with the default polarity mode, otherwise determining the image data not to be the reloaded picture with the default polarity mode.

3. The driving method of claim 2, wherein the reloaded picture comprises: one or a combination of a checkerboard picture or a striped picture.

4. The driving method of claim 3, wherein the reloaded picture comprises: the checkerboard picture; and the judging whether the acquired image data is the checkerboard picture with the default polarity mode comprises:

determining an arrangement mode of first image blocks and second image blocks formed by loading the image data according to the acquired image data; wherein each first image block comprises at least one sub-pixel; each second image block comprises at least one sub-pixel; a quantity of sub-pixels contained in the each first image block is the same as a quantity of sub-pixels contained in the each second image block; and gray scales corresponding to the each first image block differ from gray scales corresponding to the each second image block at least by 2 gray scales; and when the first image blocks and the second image blocks are all arranged alternately along a direction of rows and columns, and the polarities of the image data corresponding to each two adjacent data lines are opposite, determining the image data to be the checkerboard picture with the default polarity mode, otherwise determining the image data not to be the checkerboard picture with the default polarity mode.

5. The driving method of claim 4, wherein a row of sub-pixels of the touch display panel are correspondingly electrically connected with a same gate line; the each first image block comprises: 2k+1 columns of sub-pixels arranged in a row direction; the each second image block comprises: 2k+1 columns of sub-pixels contained in the row direction; and k is a positive integer;

and the method further comprises:

dividing data lines in the touch display panel into multiple data line groups, wherein each data line group comprises a number of data lines, and a is a multiple of 2;

the performing polarity adjustment on the image data comprises:

when determining that the image data is the checkerboard picture with the default polarity mode, adjusting the polarities of the image data loaded by a same data line group to be the same, and adjusting the polarities of the image data loaded by two adjacent data line groups to be opposite.

6. The driving method of claim 5, wherein the quantity of sub-pixels contained in the each first image block is one; or, the quantity of sub-pixels contained in the each first image block is two, and the sub-pixels contained in the each first image block and the sub-pixels contained in the each second image block are arranged along an extension direction of the data lines.

7. The driving method of claim 4, wherein a row of sub-pixels of the touch display panel are correspondingly connected with two gate lines adjacent to the row of sub-pixels; the each first image block comprises: 2y columns of sub-pixels arranged in a row direction, and the each second image block comprises: 2y columns of sub-pixels arranged in the row direction; and y is a positive integer; and the method further comprises:

dividing data lines in the touch display panel into multiple data line groups, wherein each data line group comprises b number of data lines, and b is a multiple of 2;

the performing polarity adjustment on the image data comprises:

when determining that the image data is the checkerboard picture with the default polarity mode, adjusting polarities of the image data loaded by a same data line group to be the same, and adjusting polarities of the image data loaded by two adjacent data line groups to be opposite.

8. The driving method of claim 7, wherein the quantity of sub-pixels contained in the each first image block is two, and the sub-pixels contained in the each first image block and the sub-pixels contained in the each second image block are arranged along an extension direction of the gate lines.

9. The driving method of claim 8, wherein the touch display panel comprises a first sub-pixel column to a $Q^{th}$ sub-pixel column arranged along the extension direction of the gate lines; and Q is a positive even number; and the method further comprises:

dividing two adjacent columns from the first sub-pixel column to the $Q^{th}$ sub-pixel column into a second sub-pixel column group, wherein each second sub-pixel column group comprises the first image blocks and the second image blocks which are arranged alternately along a column direction; or, dividing two adjacent columns from a second sub-pixel column to a $(Q-1)^{th}$ sub-pixel column into a first sub-pixel column group, wherein each first sub-pixel column group comprises the first image blocks and the second image blocks which are arranged alternately along a column direction; and the first sub-pixel column and the $Q^{th}$ sub-pixel column respectively comprise the first sub-pixels and the second sub-pixels which are arranged alternately; wherein gray scales corresponding to the first sub-pixels are roughly the same as the gray scales corresponding to the each first image block, gray scales corresponding to the second sub-pixels are roughly the same as the gray scales corresponding to the each second image block, and the first sub-pixels and the second image blocks are adjacent in the row direction, and the second sub-pixels and the first image blocks are adjacent in the row direction.

10. The driving method of claim 3, wherein the reloaded picture comprises: the striped picture; and the judging whether the acquired image data is the striped picture with the default polarity mode comprises:

determining an arrangement mode of third image blocks and fourth image blocks formed by loading the image data according to the acquired image data; wherein each third image block includes at least two sub-pixels and each fourth image block includes at least two sub-pixels, and gray scales corresponding to the each third image block differ from gray scales corresponding to the each fourth image block at least by 2 gray scales; and when the third image blocks are arranged into multiple columns along a row direction, the fourth image blocks are arranged into multiple columns along the row direction, the third image blocks and the fourth image blocks are arranged alternately along the row direction, and polarities of the image data corresponding to two adjacent data lines are opposite, determining the image data to be the striped picture with the default polarity mode, otherwise, determining the image data not to be the striped picture with the default polarity mode.

11. The driving method of claim 10, wherein a row of sub-pixels of the touch display panel are correspondingly connected with two gate lines adjacent to the row of sub-pixels; the each third image block comprises 2m columns of sub-pixels arranged in the row direction, the each fourth image block comprises 2m columns of sub-pixels arranged in the row direction, and m is an odd number; and the method further comprises:
dividing data lines in the touch display panel into multiple data line groups, wherein each data line group comprises c number of data lines, and c is a multiple of 2;
the performing polarity adjustment on the image data comprises:
when determining that the image data is the striped picture with the default polarity mode, adjusting the polarities of the image data loaded by a same data line group to be the same, and adjusting the polarities of the image data loaded by two adjacent data line groups to be opposite.

12. The driving method of claim 11, wherein the touch display panel comprises a first sub-pixel column to a $P^{th}$ sub-pixel column which are arranged along an extension direction of the gate lines; and P is a positive even number;
a second sub-pixel column to a $(P-1)^{th}$ sub-pixel column comprise arranged third image blocks and fourth image blocks, gray scales corresponding to sub-pixels in the first sub-pixel column are the same, and gray scales corresponding to sub-pixels in the $P^{th}$ sub-pixel column are the same, wherein the third image block comprises two adjacent columns of sub-pixels arranged in the row direction, the fourth image block comprises two adjacent columns of sub-pixels arranged in the row direction, the gray scale corresponding to the first sub-pixel column is different from the gray scale corresponding to the second sub-pixel column, and the gray scale corresponding to the $P^{th}$ sub-pixel column is different from the gray scale corresponding to the $(P-1)^{th}$ sub-pixel column.

13. The driving method of claim 12, wherein the gray scales corresponding to sub-pixels in the first sub-pixel column, the $P^{th}$ sub-pixel column and the each third image block are roughly the same.

14. The driving method of claim 3, wherein the reloaded picture comprises: a mixed picture containing the checkerboard picture and the striped picture; and the performing polarity adjustment on the image data comprises:
when determining the image data to be the mixed picture with the default polarity mode, adjusting the quantity of the first data lines to be roughly the same as the quantity of the second data lines.

15. A readable non-temporary storage medium, wherein the readable non-temporary storage medium stores executable instructions of the touch display panel, and the executable instructions of the touch display panel are configured to enable the touch display panel to perform the method for driving the touch display panel according to claim 1.

16. A device for driving a touch display panel, comprising:
an acquisition circuit, configured to acquire image data of an image to be displayed;
a judgment circuit, configured to judge whether the acquired image data is a reloaded picture with a default polarity mode, wherein the default polarity mode comprises: polarities of the image data corresponding to each two adjacent data lines are opposite, and polarities of the image data corresponding to a same data line are the same;
an adjustment circuit, configured to perform polarity adjustment on the image data when the image data is judged to be the reloaded picture with the default polarity mode; and
a display driving circuit, configured to drive the touch display panel to display image according to the image data after polarity adjustment.

17. A display device, comprising the touch display panel and the driving device of claim 16.

18. A computer device, comprising a memory, a processor, and computer programs stored on the memory and capable of running on the processor, wherein the processor is configured to read and execute the computer programs to perform following operations:
acquiring image data of an image to be displayed;
judging whether the acquired image data is a reloaded picture with a default polarity mode, wherein the default polarity mode comprises: polarities of the image data corresponding to each two adjacent data lines are opposite, and polarities of the image data corresponding to a same data line are the same;
performing polarity adjustment on the image data when judging that the image data is the reloaded picture with the default polarity mode; and
driving a touch display panel to display image according to the image data after polarity adjustment.

* * * * *